(12) United States Patent
Wakabayashi et al.

(10) Patent No.: US 11,533,641 B2
(45) Date of Patent: Dec. 20, 2022

(54) TRANSMISSION OF MEASUREMENT REPORTS IN A WIRELESS COMMUNICATION SYSTEM

(71) Applicant: Sony Corporation, Tokyo (JP)

(72) Inventors: Hideji Wakabayashi, Basingstoke (GB); Matthew William Webb, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/587,072

(22) Filed: Sep. 30, 2019

(65) Prior Publication Data

US 2020/0029232 A1  Jan. 23, 2020

Related U.S. Application Data

(62) Division of application No. 15/024,728, filed as application No. PCT/EP2014/072408 on Oct. 20, 2014, now Pat. No. 10,448,270.

(30) Foreign Application Priority Data

Oct. 31, 2013 (EP) .................................. 13191214

(51) Int. Cl.
    *H04W 24/08* (2009.01)
    *H04W 24/10* (2009.01)
    (Continued)

(52) U.S. Cl.
    CPC ........... *H04W 24/08* (2013.01); *H04L 1/0026* (2013.01); *H04L 5/0053* (2013.01); *H04W 24/10* (2013.01); *H04W 72/085* (2013.01)

(58) Field of Classification Search
    CPC ... H04W 24/08; H04W 24/10; H04W 72/085; H04L 1/0026; H04L 5/0053
    See application file for complete search history.

(56) References Cited

U.S. PATENT DOCUMENTS

2004/0037247 A1    2/2004  Ngo
2008/0026744 A1    1/2008  Frederiksen et al.
(Continued)

FOREIGN PATENT DOCUMENTS

EP    1 656 765 A1    5/2006
GB    2487757 A       8/2012
(Continued)

OTHER PUBLICATIONS

ETSI TS 122 368, "Digital cellular telecommunications system (Phase 2+); Universal Mobile Telecommunications System (UMTS); LTE; Service requirements for Machine-Type Communications (MTC); Stage 1 (3GPP TS 22.368 version 11.6.0 Release 11)", V11.6.0, Total 21 Pages, (Sep. 2012).

(Continued)

*Primary Examiner* — John D Blanton
(74) *Attorney, Agent, or Firm* — Xsensus LLP

(57) ABSTRACT

A wireless telecommunications system including a base station and terminal device, supporting a virtual carrier mode with downlink communications made by the base station using a radio interface spanning a system frequency bandwidth while the terminal device can receive at least some communications from the base station within a restricted subset of transmission resources selected from within the system frequency bandwidth providing a restricted bandwidth downlink. The terminal device can measure channel conditions across the system frequency bandwidth and transmit corresponding measurement reports to the base station. Measurement reports for transmission resources not including the restricted bandwidth downlink channel may be aperiodic while measurement reports for transmission resources including the restricted bandwidth downlink channel may be periodic. Measurement reports for transmission resources not including the restricted band- (Continued)

width downlink channel may be based on a subset of the channel condition measurements selected because they are associated with relatively poor channel conditions.

15 Claims, 8 Drawing Sheets

(51) Int. Cl.
*H04L 5/00* (2006.01)
*H04L 1/00* (2006.01)
*H04W 72/08* (2009.01)

(56) References Cited

U.S. PATENT DOCUMENTS

| | | | |
|---|---|---|---|
| 2011/0134771 A1* | 6/2011 | Chen | H04L 1/0027 370/252 |
| 2011/0249578 A1* | 10/2011 | Nayeb Nazar | H04L 5/0053 370/252 |
| 2013/0077514 A1 | 3/2013 | Dinan | |
| 2013/0155974 A1* | 6/2013 | Papasakellariou | H04L 1/0026 370/328 |
| 2013/0188537 A1 | 7/2013 | Marque-Pucheu et al. | |
| 2013/0301524 A1 | 11/2013 | Xu et al. | |
| 2014/0226613 A1* | 8/2014 | Kim | H04L 1/1896 370/329 |
| 2015/0098412 A1 | 4/2015 | Yerramalli et al. | |
| 2015/0215090 A1* | 7/2015 | Sayana | H04B 7/0695 370/329 |
| 2015/0382222 A1* | 12/2015 | Park | H04L 5/0057 370/252 |
| 2016/0127952 A1* | 5/2016 | You | H04W 72/085 370/252 |
| 2018/0035425 A1 | 2/2018 | Yang et al. | |
| 2020/0252824 A1* | 8/2020 | Dinan | H04W 72/042 |

FOREIGN PATENT DOCUMENTS

| | | |
|---|---|---|
| GB | 2487780 A | 8/2012 |
| GB | 2487782 A | 8/2012 |
| GB | 2487906 A | 8/2012 |
| GB | 2487907 A | 8/2012 |
| GB | 2487908 A | 8/2012 |
| GB | 2487909 A | 8/2012 |
| GB | 2488513 A | 9/2012 |
| GB | 2497742 A | 6/2013 |
| GB | 2497743 A | 6/2013 |
| GB | 2509912 A | 7/2014 |
| GB | 2509913 A | 7/2014 |
| GB | 2509973 A | 7/2014 |
| WO | 2010/144729 A2 | 12/2010 |

OTHER PUBLICATIONS

Harri Holma, et al., "LTE for UMTS OFDMA and SC-FDMA Based Radio Access", John Wiley and Sons, Total 4 Pages, (2009).
ETSI TS 136 213, LTE; Evolved Universal Terrestrial Radio Access (E-UTRA); Physical layer procedures (3GPP TS 36.213 version 11.4 0 Release 11 ), V11.4.0, Total 184 Pages, (Oct. 2013).
3GPP TSG RAN WHI #74, "Details of narrow bandwidth design for low-complexity MTC UE", Sony, Agenda Item: 7.2 4 1, R1-133039, pp. 1-3, (Aug. 19-23, 2013).
International Search Report dated May 22, 2015 in PCT/EP14/072408 Filed Oct. 20, 2014.

* cited by examiner

TRANSMISSION OF MEASUREMENT REPORTS IN A WIRELESS COMMUNICATION SYSTEM

CROSS-REFERENCE TO RELATED APPLICATIONS

The present application is a divisional of U.S. application Ser. No. 15/024,728, filed Mar. 24, 2016, which is based on PCT filing PCT/EP2014/072408, filed Oct. 20, 2014, which claims priority to EP 13191214.9, filed Oct. 31, 2013, the entire contents of each are incorporated herein by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The present disclosure relates to wireless telecommunications systems and methods, and in particular to systems and methods for restricted frequency resource/virtual carrier operation in wireless telecommunication systems.

Mobile communication systems have evolved over the past ten years or so from the GSM System (Global System for Mobile communications) to the 3G system and now include packet data communications as well as circuit switched communications. The third generation partnership project (3GPP) is developing a fourth generation mobile communication system referred to as Long Term Evolution (LTE) in which a core network part has been evolved to form a more simplified architecture based on a merging of components of earlier mobile radio network architectures and a radio access interface which is based on Orthogonal Frequency Division Multiplexing (OFDM) on the downlink and Single Carrier Frequency Division Multiple Access (SC-FDMA) on the uplink.

The deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, some of which are in some respects typified by semi-autonomous or autonomous wireless communication devices (MTC devices) communicating small amounts of data on a relatively infrequent basis. Examples include so-called smart meters which, for example, are located in a customer's home and periodically transmit data back to a central MTC server relating to the customer's consumption of a utility such as gas, water, electricity and so on. Smart metering is merely one example of potential MTC device applications. Further information on characteristics of MTC-type devices can be found, for example, in the corresponding standards, such as ETSI TS 122 368 V11.6.0 (2012-09)/3GPP TS 22.368 version 11.6.0 Release 11) [1].

Whilst it can be convenient for a terminal such as an MTC-type terminal to take advantage of the wide coverage area provided by a third or fourth generation mobile telecommunication network there are at present disadvantages. Unlike a conventional third or fourth generation mobile terminal such as a smartphone, a primary driver for MTC-type terminals will be a desire for such terminals to be relatively simple and inexpensive. The type of functions typically performed by an MTC-type terminal (e.g. simple collection and reporting/reception of relatively small amounts of data) do not require particularly complex processing to perform, for example, compared to a smartphone supporting video streaming. However, third and fourth generation mobile telecommunication networks typically employ advanced data modulation techniques and support wide bandwidth usage on the radio interface which can require more complex and expensive radio transceivers and decoders to implement. It is usually justified to include such complex elements in a smartphone as a smartphone will typically require a powerful processor to perform typical smartphone type functions. However, as indicated above, there is now a desire to use relatively inexpensive and less complex devices which are nonetheless able to communicate using LTE-type networks.

With this in mind there has been proposed a concept of so-called "virtual carriers" operating within the bandwidth of a "host carrier", for example, as described in GB 2 487 906 [2], GB 2 487 908 [3], GB 2 487 780 [4], GB 2 488 513 [5], GB 2 487 757 [6], GB 2 487 909 [7], GB 2 487 907 [8] and GB 2 487 782 [9]. One principle underlying the concept of a virtual carrier is that a frequency subregion (subset of frequency resources) within a wider bandwidth (greater range of frequency resources) host carrier is configured for use as a self-contained carrier for at least some types of communications with certain types of terminal device. For example, a terminal device may be configured to receive at least some communications from the base station within a restricted subset of transmission resources selected from within the system frequency bandwidth whereby the restricted subset of transmission resources comprises a downlink channel having a channel bandwidth which is smaller than the system frequency bandwidth.

In some virtual carrier implementations, such as described in references [2] to [9], all downlink control signalling and user-plane data for terminal devices using the virtual carrier may be conveyed within the subset of frequency resources associated with the virtual carrier. A terminal device operating on the virtual carrier is made aware of the restricted frequency resources and need only receive and decode a corresponding subset of transmission resources to receive data from the base station. One advantage of this approach is to provide a carrier for use by low-capability terminal devices capable of operating over only relatively narrow bandwidths. This allows devices to communicate on LTE-type networks, without requiring the devices to support full bandwidth operation. By reducing the bandwidth of the signal that needs to be decoded, the front end processing requirements (e.g., FFT, channel estimation, subframe buffering etc.) of a device configured to operate on a virtual carrier are reduced since the complexity of these functions is generally related to the bandwidth of the signal that needs to be processed.

Other virtual carrier approaches for reducing the required complexity of devices configured to communicate over LTE-type networks are proposed in GB 2 497 743 [10] and GB 2 497 742 [11]. These documents propose schemes for communicating data between a base station and a reduced-capability terminal device whereby physical-layer control information for the reduced-capability terminal device is transmitted from the base station using subcarriers selected from across a full host carrier frequency band (as for conventional LTE terminal devices). However, higher-layer data for reduced-capability terminal devices (e.g. user-plane data) is transmitted using only subcarriers selected from within a restricted subset of carriers which is smaller than and within the set of subcarriers comprising the system frequency band. Thus, this is an approach in which user-plane data for a particular terminal device may be restricted to a subset of frequency resources (i.e. a virtual carrier supported within the transmission resources of a host carrier), whereas control signalling is communicated using the full bandwidth of the host carrier. The terminal device is made aware of the restricted frequency resource, and as such need only buffer and process data within this frequency resource during periods when higher-layer data is being transmitted. The terminal device buffers and processes the full system frequency band during periods when physical-layer control information is being transmitted. Thus, the reduced-capability terminal device may be incorporated in a network in which physical-layer control information is transmitted over a wide frequency range, but only needs to have sufficient memory and processing capacity to process a smaller range of frequency resources for the higher-layer data. This approach may sometimes be referred to as a "T-shaped" allocation because the area of the downlink time-frequency resource grid to be used by the reduced-capability terminal device may in some cases comprise a generally T-shape.

Virtual carrier concepts thus allow terminal devices having reduced capabilities, for example in terms of their transceiver bandwidth and/or processing power, to be supported within LTE-type networks. As noted above, this can be useful to allow relatively inexpensive and low complexity devices to communicate using LTE-type networks. However, providing support for reduced capability devices in a wireless telecommunications system which is generally based around existing standards can require additional considerations for some operational aspects of wireless telecommunications systems to allow the reduced-capability terminal devices to operate in conjunction with conventional terminal devices.

One area where the inventors have recognised a need for new procedures concerns the reporting on radio channel conditions in wireless telecommunications systems supporting virtual carrier operations.

Wireless telecommunications systems can allow for so-called link adaptation by a network scheduling entity. Link adaptation allows a base station to modify its transmissions characteristics in a manner which takes account of channel conditions existing between the base station and a terminal device based on channel state information received from the terminal device. For example, higher data rates may be used when channel conditions are good compared to when channel conditions are bad. A significant aspect of link adaptation in LTE-based networks is channel quality indicator (CQI) reporting. As is well established, a terminal device may measure the channel quality of a downlink communication and report it back to the base station as a CQI report. The base station may then perform link adaptation based on the CQI report.

Existing LTE standards provide for CQI reports with two types of bandwidth. One is known as wideband CQI and the other is known as subband CQI. For wideband CQI a single CQI value is established for a carrier's full bandwidth and reported to the base station. For subband CQI, the full bandwidth is in effect split into more than one subband, and a CQI value is established for each subband. The wideband CQI approach is simple and provides for compact signalling whereas the subband CQI approach can allow a scheduler to take account of frequency selective channel conditions (e.g. frequency-dependent fading).

The inventors have recognised that particular considerations can apply when considering channel conditions, for example through CQI measurement and reporting, in the context of virtual carriers and there is therefore a desire to provide for improved schemes for reporting on channel conditions in wireless telecommunications systems supporting virtual carrier operation.

SUMMARY

According to a first aspect of the present disclosure, there is provided a method of operating a terminal device in a wireless telecommunications system in which downlink communications are made by a base station using a radio interface that spans a system frequency bandwidth. The terminal device is configured to receive at least some communications from the base station within a restricted subset of transmission resources selected from within the system frequency bandwidth and comprising a restricted bandwidth downlink channel having a channel bandwidth which is smaller than the system frequency bandwidth. The method comprises measuring channel conditions across the system frequency bandwidth; and transmitting to the base station channel condition measurement reports for a plurality of frequencies across the system frequency bandwidth, wherein a resolution of the measurement reports for transmission resources not comprising the restricted bandwidth downlink channel is less than a resolution of the measurement reports for transmission resources comprising the restricted bandwidth downlink channel. According to the present disclosure a wireless telecommunications system system supports a virtual carrier mode of operation in which downlink communications are made by the base station using a radio interface that spans a system frequency bandwidth while the terminal device is configured to receive at least some communications from the base station within a restricted subset of transmission resources selected from within the system frequency bandwidth to provide a restricted bandwidth downlink. The terminal device is configured to measure channel conditions across the system frequency bandwidth and transmit corresponding measurement reports to the base station. The frequency and/or time resolution of the measurement reports may be greater for transmission resources comprising the restricted bandwidth downlink channel than for transmission resources non comprising the restricted bandwidth downlink channel. The measurement reports for transmission resources not comprising the restricted bandwidth downlink channel may be aperiodic while the measurement reports for transmission resources comprising the restricted bandwidth downlink channel may be periodic. The measurement reports for transmission resources not comprising the restricted bandwidth downlink channel may be based on a subset of the channel condition measurements selected because they are associated with relatively poor channel conditions.

As will be appreciated from the following description, scheduling decisions for allocating downlink transmission resources may take account of CQI reports received from terminal devices. Embodiments of the present technique can therefore provide CQI reports which allow a base station to identify which transmission resource allocations for which terminal devices can help optimise overall data transfer rates in the system. In effect, the base station uses the CQI reports to schedule transmissions for terminal devices on transmission resources which are associated with relatively good channel conditions for the respective terminal devices. In this regard, a greater degree of optimisation can generally be achieved with high resolution CQI reporting (both in terms of frequency and time resolution). However, with high-resolution CQI reporting comes an increased uplink signalling overhead from the terminal device. There is therefore generally a need to balance a desire for high resolution CQI reporting against the drawback of an associated higher uplink signalling overhead from the terminal device. The inventors have recognised an appropriate balance between these factors may be different for virtual carrier operation as compared to non-virtual carrier operation.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
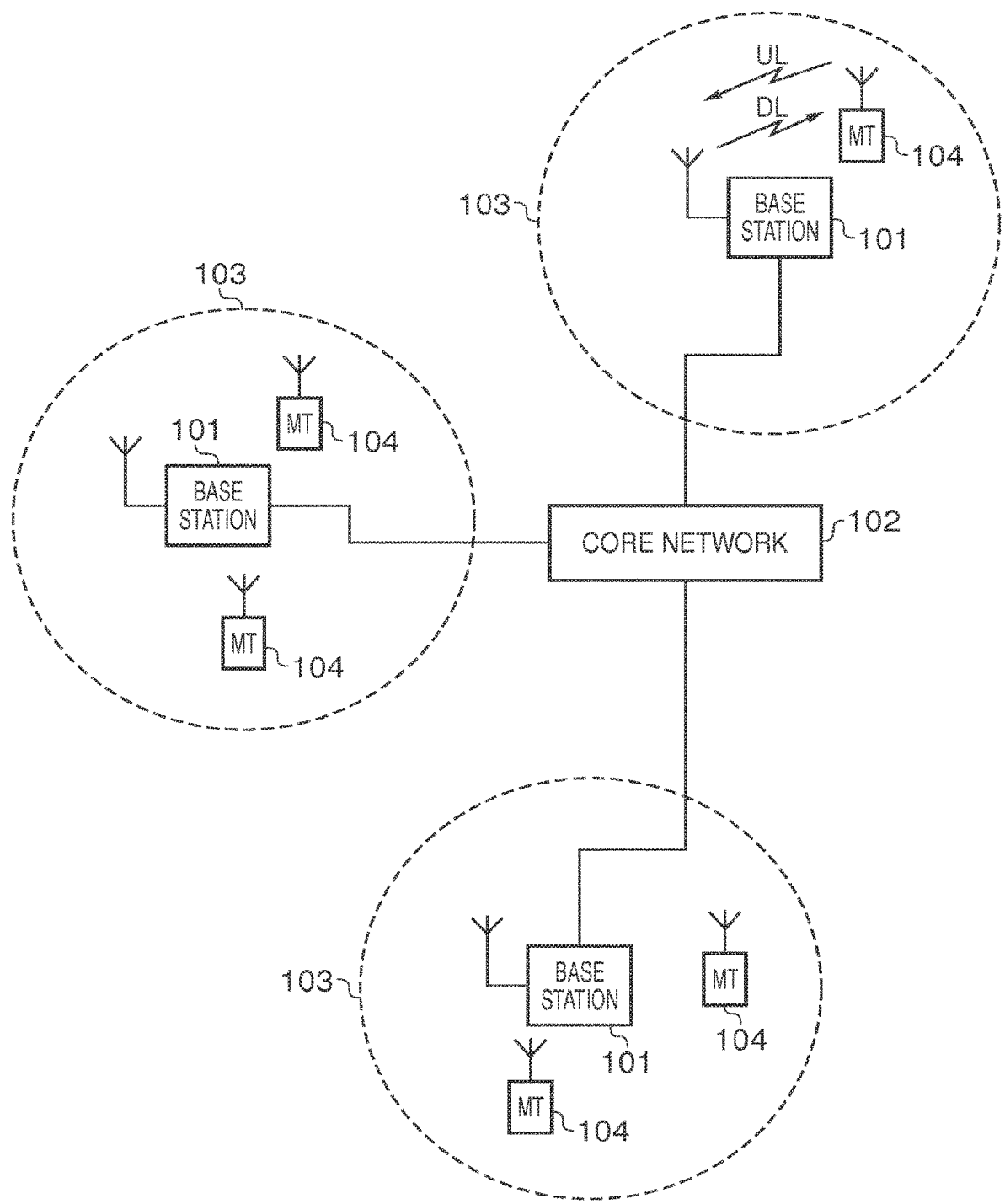
FIG. 1 schematically represents an example of a LTE-type wireless telecommunication network.

FIG. 1 provides a schematic diagram illustrating some basic functionality of a wireless telecommunications network/system 100 operating in accordance with LTE principles. Various elements of FIG. 1 and their respective modes of operation are well-known and defined in the relevant standards administered by the 3GPP® body and also described in many books on the subject, for example, Holma, H. and Toskala, A. [12].

The network 100 includes a plurality of base stations 101 connected to a core network 102. Each base station provides a coverage area 103 (i.e. a cell) within which data can be communicated to and from terminal devices 104. Data are transmitted from base stations 101 to terminal devices 104 within their respective coverage areas 103 via a radio downlink. Data are transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, and so forth. Base stations may also be referred to as transceiver stations/nodeBs/e-NodeBs, and so forth.

Figure 2:
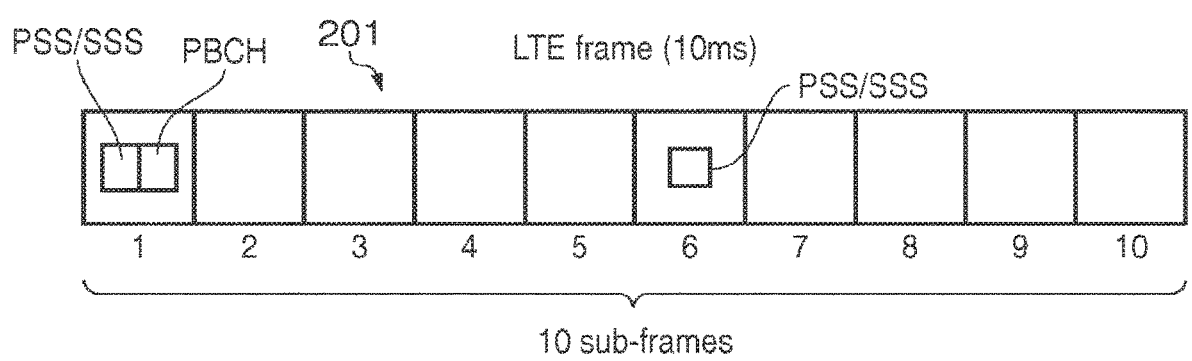
FIG. 2 schematically represents some aspects of a LTE downlink radio frame structure.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and a single carrier frequency division multiplex based interface for the radio uplink (so-called SC-FDMA). FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

A broadly corresponding frame structure is used for uplink (i.e. an uplink radio frame also lasts 10 ms and comprises ten uplink subframes, each comprising two slots of 0.5 ms duration).

Figure 3:
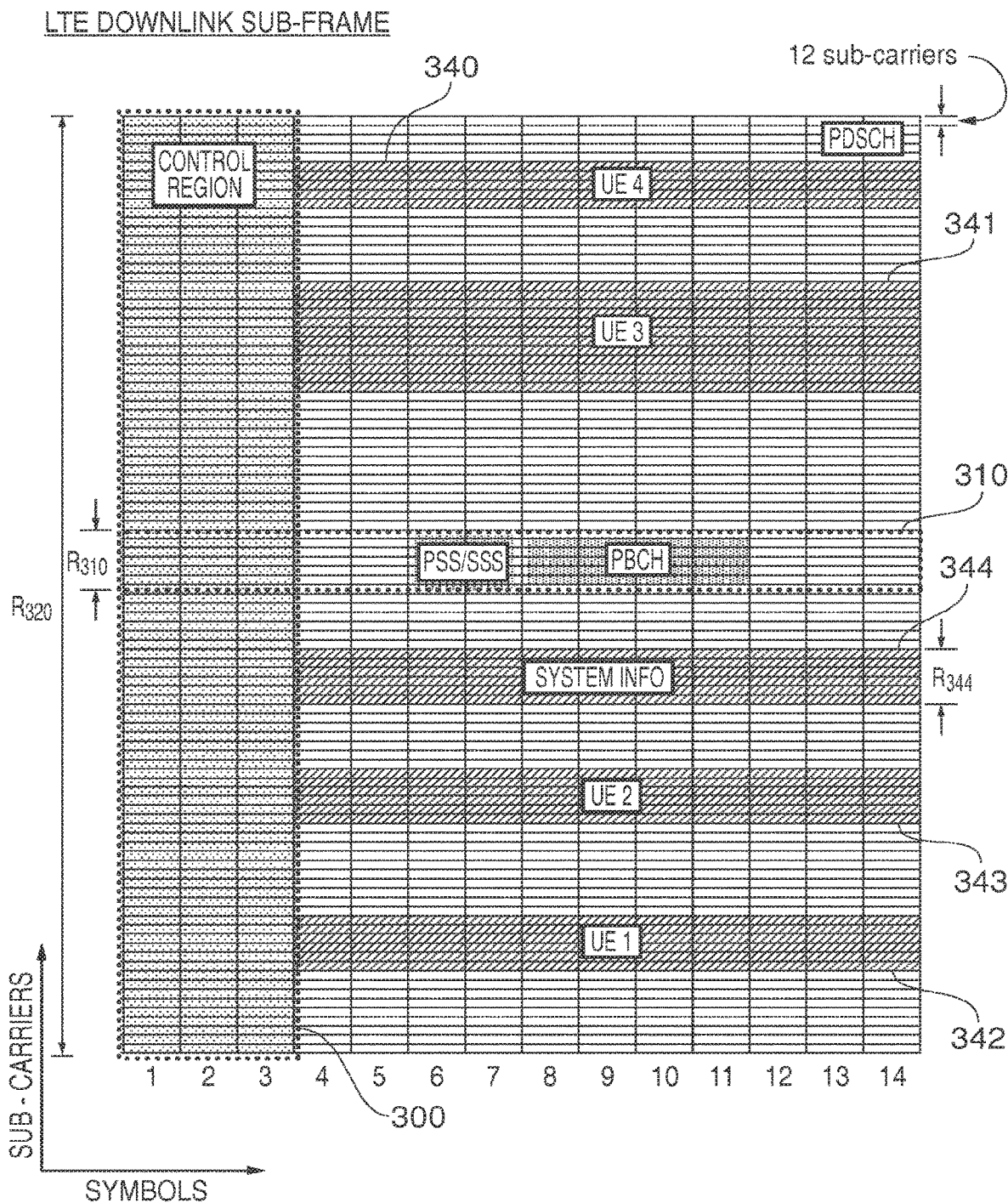
FIG. 3 schematically represents some aspects of a LTE downlink radio subframe structure.

FIG. 3 is a schematic diagram of a grid which illustrates the structure of an example conventional downlink LTE subframe (corresponding in this example to the first, i.e. left-most, subframe in the frame of FIG. 2). The subframe comprises a predetermined number of symbols which are transmitted over a 1 ms period. Each symbol comprises a predetermined number of orthogonal sub-carriers distributed across the bandwidth of the downlink radio carrier.

The example subframe shown in FIG. 3 comprises 14 symbols and 1200 sub-carriers spread across a 20 MHz bandwidth. The smallest allocation of user data for transmission in LTE is a resource block comprising twelve sub-carriers transmitted over one slot (0.5 subframe). For clarity, in FIG. 3, each individual resource element (a resource element comprises a single symbol on a single subcarrier) is not shown, instead each individual box in the subframe grid corresponds to twelve sub-carriers transmitted on one symbol (i.e. the number of subcarriers comprising one physical resource block, PRB).

FIG. 3 shows resource allocations for four LTE terminals 340, 341, 342, 343. For example, the resource allocation 342 for a first LTE terminal (UE 1) extends over five blocks of twelve sub-carriers (i.e. 60 sub-carriers), the resource allocation 343 for a second LTE terminal (UE2) extends over six blocks of twelve sub-carriers and so on.

Control channel data are transmitted in a control region 300 (indicated by dotted-shading in FIG. 3) of the subframe comprising the first n symbols of the subframe where n can vary between one and three symbols for channel bandwidths of 3 MHz or greater and where n can vary between two and four symbols for channel bandwidths of 1.4 MHz. For the sake of providing a concrete example, the following description relates to carriers with a channel bandwidth of 3 MHz or greater so the maximum value of n will be 3. The data transmitted in the control region 300 includes data transmitted on the physical downlink control channel (PDCCH), the physical control format indicator channel (PCFICH) and the physical HARQ indicator channel (PHICH).

PDCCH contains control data indicating which sub-carriers on which symbols of the subframe have been allocated to specific LTE terminals. Thus, the PDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on. PDCCH also contains control data indicating uplink resource allocations.

PCFICH contains control data indicating the size of the control region (i.e. between one and three symbols).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow an LTE terminal device to achieve frame synchronisation and determine the cell identity of the enhanced Node B transmitting the downlink signal. The PBCH carries information about the cell, comprising a master information block (MIB) that includes parameters that LTE terminals use to properly access the cell. Data transmitted to individual LTE terminals on the physical downlink shared channel (PDSCH) can be transmitted in other resource elements of the subframe.

FIG. 3 also shows a region of PDSCH containing system information and extending over a bandwidth of R344.

A conventional LTE frame will also include reference signals which are not shown in FIG. 3 in the interests of clarity. As is known in the art, in OFDM-based transmission systems, such as LTE, a number of sub-carriers in symbols throughout the subframes are typically reserved for the transmission of reference signals. Reference signals are conventionally transmitted on sub-carriers distributed throughout a subframe across the channel bandwidth and across the OFDM symbols. The reference signals are arranged in a repeating pattern and can be used by a receiver to estimate the channel function applied to the data transmitted on each sub-carrier using extrapolation and interpolation techniques. These reference signals are also typically used for additional purposes such as determining metrics for received signal power indications, automatic frequency control metrics and automatic gain control metrics. In LTE the positions of the reference signal bearing sub-carriers within each subframe are predetermined and known at the transceiver of each terminal.

In a conventional LTE downlink subframes, there are a number of different reference signals, transmitted for different purposes. One example is the cell-specific reference signal, broadcast to all terminals. Cell-specific reference symbols are typically inserted on every sixth sub-carrier on each transmit antenna port on which they occur. Accordingly, if a virtual carrier is inserted in an LTE downlink subframe, even if the virtual carrier has a minimum bandwidth of one resource block (i.e. twelve sub-carriers) the virtual carrier will include at least some cell-specific reference signal bearing sub-carriers.

There are sufficient reference signal bearing sub-carriers provided in each subframe such that a receiver need not accurately receive every single reference signal to decode the data transmitted in the subframe. However, as will be understood the more reference signals that are received, the better a receiver will generally be able to estimate the channel response, and hence fewer errors will typically be introduced into the data decoded from the subframe. Accordingly, in order to preserve compatibility with LTE communication terminals receiving data on the host carrier, in accordance with some virtual carrier implementations the sub-carrier positions that would contain reference signals in a conventional LTE subframe are retained in the virtual carrier.

Figure 4:
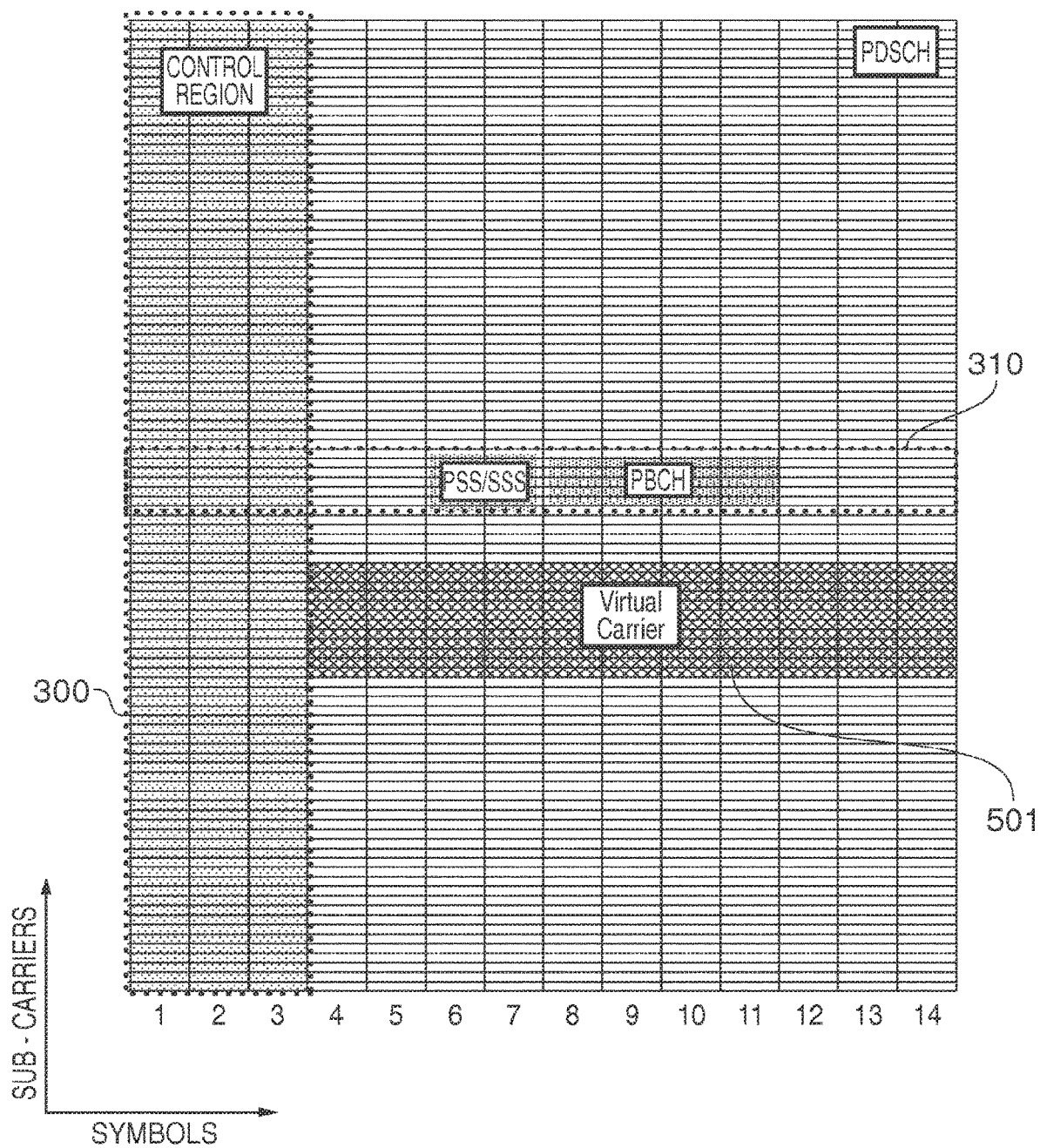
FIG. 4 schematically represents some aspects of a LTE downlink radio subframe structure associated with a host carrier supporting a virtual carrier.

FIG. 4 is a diagram which is similar to and will in many respect be understood from FIG. 3. However, FIG. 4 differs from FIG. 3 in schematically representing a downlink radio subframe corresponding to a host carrier in which a virtual carrier 401 (VC) is supported. The general operation of the virtual carrier represented in FIG. 4 may be in accordance with previously-proposed schemes, for example as described in any of the above-identified documents [2] to [11]. The virtual carrier thus represents a restricted subset of downlink transmission resources within the overall transmission resource grid associated with the host carrier which may be used for communicating at least some information with certain types of terminal devices, for example, reduced capability machine type communication terminal devices.

Thus, a conventional (i.e. non-reduced capability) terminal device may be supported using the full bandwidth of the resource grid represented in FIG. 4 in accordance with conventional LTE techniques. Downlink communications for a reduced-capability terminal device, on the other hand, may be restricted to a subset of transmission resources within the virtual carrier.

In some cases the entirety of the downlink communications for the reduced-capability terminal device (i.e. including control signalling and higher layer/user-plane data) may be conveyed within the transmission resources of one of the virtual carriers, for example in accordance with the principles proposed in the above-identified documents [2] to [9]. This may be appropriate, for example, for a terminal device which cannot receive the full bandwidth of the host carrier (and hence cannot receive the entirety of the control region 300).

In other cases the reduced-capability terminal device may be able to receive the full-bandwidth of the host carrier (and hence receive and decode the control region 300), but may be restricted as to its ability to buffer and decodes the entirety of the PDSCH region, and so may buffer and decode only a subset of the downlink transmission resources spanning the virtual carrier to which the terminal device has been allocated, for example in accordance with the "T-shaped allocation" principles proposed in the above-identified documents [10] and [11]. While this mode of operation may be referred to as a "T-shaped allocation" mode of operation for ease of reference, the PDSCH resources allocated to the reduced-capability terminal device need not be contiguous in frequency. That is to say that while the virtual carrier resources schematically represented in FIG. 4 are shown as a continuous block, in some examples the restricted subset of resources may be a subset of OFDM carriers distributed (spread) across the system bandwidth. Furthermore, it will be appreciated the subset of OFDM subcarriers comprising a virtual carrier for one particular terminal device may be different from a subset of OFDM subcarriers associated with supporting virtual carrier operation for another terminal device.

In some circumstances the frequency resources comprising a virtual carrier may be fixed in accordance with a predefined operating standard for the wireless telecommunications system. In other cases the frequency resources comprising the virtual carrier may be selected by the base station, for example taking account of current traffic and channel conditions. The process of selecting appropriate frequency resources to support a particular virtual carrier may be referred to as the process of allocating or configuring a virtual carrier. Where the frequency resources supporting the virtual carrier are not fixed, they may be semi-statically allocated. That is to say, the same resources may be used to support a particular terminal device on a virtual carrier until it is decided, for example as a consequence of changing channel conditions for the terminal device, that it would be better supported using a different subset of transmission resources to provide the virtual carrier operation. Some example techniques for establishing an appropriate subset of transmission resources to use, e.g. PDSCH resources to buffer in a T-shape allocation implementation, can be found in GB 2 497 743 [10] and GB 2 497 742 [11], but in general any suitable technique can be used.

As already mentioned, a broadly corresponding frame structure may be used for uplink as for downlink in wireless telecommunications systems. Thus in an LTE-type system an uplink radio frame comprises 10 radio subframes of 1 ms duration with each subframe comprising two slots. Uplink radio communications in LTE-based networks are based on single carrier-frequency division multiple access (SC-FDMA) and support various communication channels, such as a physical uplink control channel (PUCCH), a physical random access channel (PRACH) and a physical uplink shared channel (PUSCH).

The inventors have recognized that in some situations it can be helpful to adopt modified channel condition reporting procedures in wireless telecommunications systems supporting virtual carrier modes of operation. In an LTE-based wireless telecommunications system channel condition reporting (channel state information reporting) employs channel quality indicator (CQI) reports.

As is well known, CQI reports may be provided with different frequency resolution (granularity). In particular, CQI reporting may be wideband or subband. Wideband CQI reporting involves the transmission of a single CQI value for a full system bandwidth. CQI subband reporting, on the other hand, involves the transmission of CQI values for a number of different subregions of the full system bandwidth. CQI subband reporting may be based on subbands selected by the terminal device (UE selected subband CQI reporting) or subbands configured by the network (higher layer configured subband CQI reporting). For UE-selected subband CQI reporting, the terminal device measures channel conditions for a plurality of subregions of the system bandwidth, and is provided with a predefined number, M, of the subregions and provides CQI reports for the M subregions which are associated with the best channel conditions. This is sometimes referred to as "best M" CQI reporting. Higher layer configured subband CQI reporting involves the terminal device measuring channel conditions and providing CQI reports for a plurality of subregions of the system bandwidth in accordance with the current configuration. Higher layer configured subband CQI reporting typically allows for the highest CQI reporting resolution. More information on the established practices for CQI reporting can be found, for example, in the relevant standards, such as ETSI TS 136 213 V11.4.0 (2013-10) [13].

Scheduling decisions for allocating downlink transmission resources may take account of CQI reports received from terminal devices. In broad summary, CQI reports allow a base station to identify which transmission resource allocations for which terminal devices can help optimise overall data transfer rates in the system. In effect, the base station uses the CQI reports to schedule transmissions for terminal devices on transmission resources which are associated with relatively good channel conditions for the respective terminal devices. In this regard, a greater degree of optimisation can generally be achieved with high resolution CQI reporting (both in terms of frequency and time resolution). However, with high-resolution CQI reporting comes an increased uplink signalling overhead from the terminal device. There is therefore generally a need to balance a desire for high resolution CQI reporting against the drawback of an associated higher uplink signalling overhead from the terminal device. The inventors have recognised an appropriate balance between these factors may be different for virtual carrier operation as compared to non-virtual carrier operation.

Figure 5:
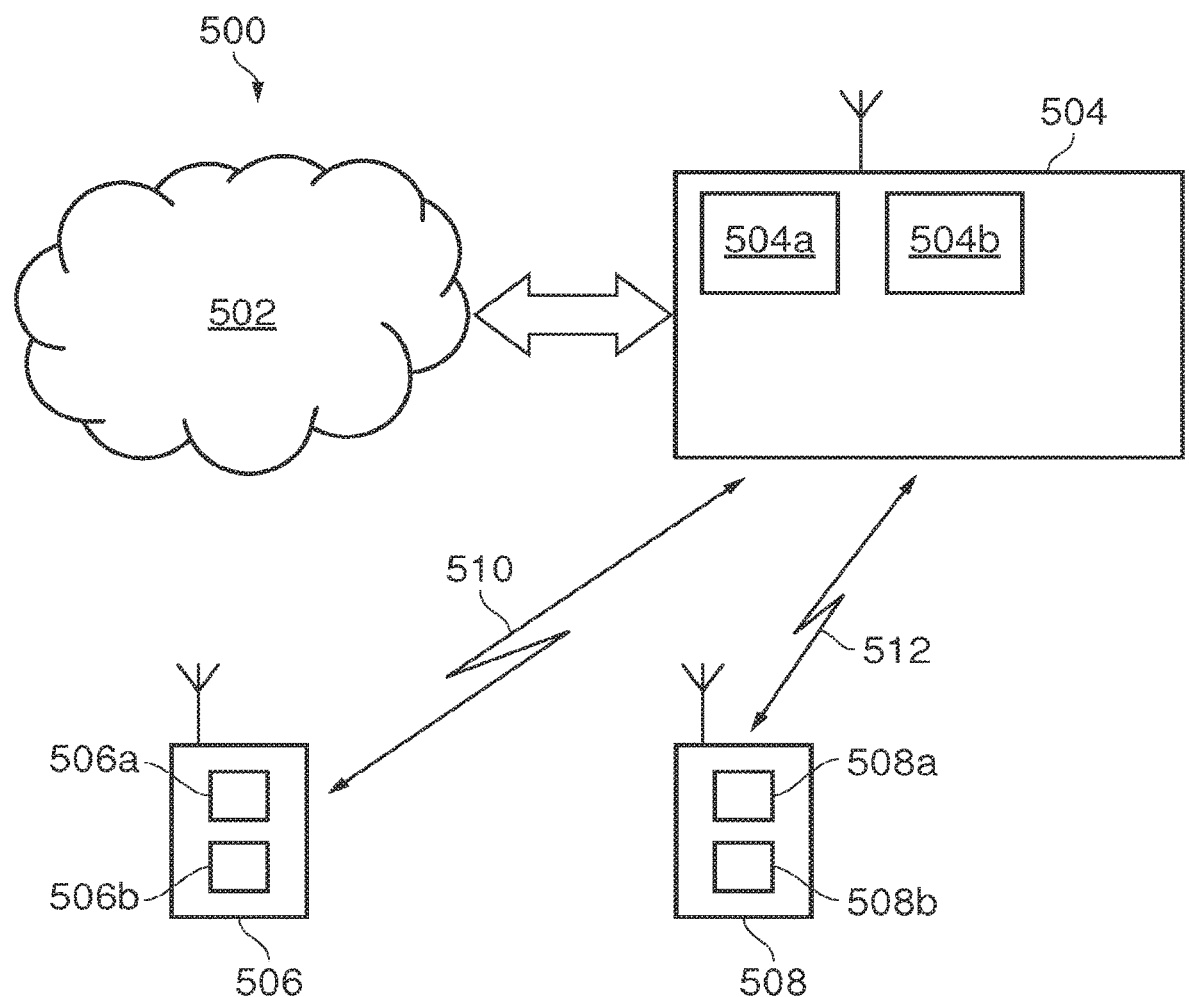
FIG. 5 schematically represents an adapted LTE-type wireless telecommunications system arranged in accordance with an example of the present disclosure.

FIG. 5 schematically shows a telecommunications system 500 according to an embodiment of the present disclosure. The telecommunications system 500 in this example is based broadly around an LTE-type architecture which supports virtual carrier operations such as discussed above. Many aspects of the operation of the telecommunications system 500 are known and understood and are not described here in detail in the interest of brevity. Operational aspects of the telecommunications system 500 which are not specifically described herein may be implemented in accordance with any known techniques, for example according to the current LTE-standards with modifications as appropriate to incorporate virtual carrier operation, such as disclosed in GB 2 487 906 [2], GB 2 487 908 [3], GB 2 487 780 [4], GB 2 488 613 [5], GB 2 487 757 [6], GB 2 487 909 [7], GB 2 487 907 [8], GB 2 487 782 [9], GB 2 497 743 [10] and GB 2 497 742 [11], the entire contents of which are incorporated herein by reference.

The telecommunications system 500 comprises a core network part (evolved packet core) 502 coupled to a radio network part. The radio network part comprises a base station (evolved-nodeB) 504 coupled to a plurality of terminal devices. In this example, two terminal devices are shown, namely a first terminal device 506 and a second terminal device 508. It will of course be appreciated that in practice the radio network part may comprise a plurality of base stations serving a larger number of terminal devices across various communication cells. However, only a single base station and two terminal devices are shown in FIG. 5 in the interests of simplicity.

As with a conventional mobile radio network, the terminal devices 506, 508 are arranged to communicate data to and from the base station (transceiver station) 504. The base station is in turn communicatively connected to a serving gateway, S-GW, (not shown) in the core network part which is arranged to perform routing and management of mobile communications services to the terminal devices in the telecommunications system 500 via the base station 504. In order to maintain mobility management and connectivity, the core network part 502 also includes a mobility management entity (not shown) which manages the enhanced packet service, EPS, connections with the terminal devices 506, 508 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 5 may be broadly conventional, for example in accordance with established telecoms standards and the principles set out in the referenced documents mentioned herein, apart from where modified to provide functionality in accordance with embodiments of the present disclosure as discussed herein.

In this example, it is assumed the first terminal device 506 is a conventional smartphone type terminal device communicating with the base station 504 in a conventional manner. This conventional terminal device 506 comprises a transceiver unit 506a for transmission and reception of wireless signals and a processor unit (controller unit) 506b configured to control the device 506. The processor unit 506b may comprise a processor unit which is suitably configured/programmed to provide the desired functionality using conventional programming/configuration techniques for equipment in wireless telecommunications systems. The transceiver unit 506a and the processor unit 506b are schematically shown in FIG. 5 as separate elements. However, it will be appreciated that the functionality of these units can be provided in various different ways, for example using a single suitably programmed general purpose computer, or suitably configured application-specific integrated circuit(s)/circuitry. As will be appreciated the conventional terminal device 506 will in general comprise various other elements associated with its operating functionality.

In this example, it is assumed the second terminal device 508 is a machine-type communication (MTC) terminal device 504 adapted to operate in a virtual carrier (VC) mode in accordance with embodiments of the present disclosure when communicating with the base station 504. As discussed above, machine-type communication terminal devices can in some cases be typically characterised as semi-autonomous or autonomous wireless communication devices communicating small amounts of data. Examples include so-called smart meters which, for example, may be located in a customer's house and periodically transmit information back to a central MTC server data relating to the customer's consumption of a utility such as gas, water, electricity and so on. MTC devices may in some respects be seen as devices which can be supported by relatively low bandwidth communication channels having relatively low quality of service (QoS), for example in terms of latency. It is assumed here the MTC terminal device 508 in FIG. 5 is such a device.

The MTC device 508 comprises a transceiver unit 508a for transmission and reception of wireless signals and a processor unit (controller unit) 508b configured to control the MTC device 508. The processor unit 508b may comprise various sub-units for providing functionality in accordance with some embodiments of the present disclosure as explained further herein. These sub-units may be implemented as discrete hardware elements or as appropriately configured functions of the processor unit. Thus the processor unit 508b may comprise a processor which is suitably configured/programmed to provide the desired functionality described herein using conventional programming/configuration techniques for equipment in wireless telecommunications systems. The transceiver unit 508a and the processor unit 508b are schematically shown in FIG. 5 as separate elements for ease of representation. However, it will be appreciated that the functionality of these units can be provided in various different ways, for example using a single suitably programmed general purpose computer, or suitably configured application-specific integrated circuit(s)/ circuitry, or using a plurality of discrete circuitry/processing elements for providing different elements of the desired functionality. It will be appreciated the MTC device 508 will in general comprise various other elements associated with its operating functionality in accordance with established wireless telecommunications techniques.

The base station 504 comprises a transceiver unit 504a for transmission and reception of wireless signals and a processor unit (controller unit) 504b configured to control the base station 504 to operate in accordance with embodiments of the present disclosure as described herein. The processor unit 506b may again comprise various sub-units for providing functionality in accordance with embodiments of the present disclosure as explained further below. These sub-units may be implemented as discrete hardware elements or as appropriately configured functions of the processor unit. Thus, the processor unit 504b may comprise a processor which is suitably configured/programmed to provide the desired functionality described herein using conventional programming/configuration techniques for equipment in wireless telecommunications systems. The transceiver unit 504a and the processor unit 504b are schematically shown in FIG. 5 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 504 will in general comprise various other elements associated with its operating functionality in accordance with established wireless telecommunications techniques.

Thus, the base station 504 is configured to communicate data with both the conventional terminal device 506 and the terminal device 508 according to an embodiment of the disclosure over respective communication links 510, 512. The communication link 510 for communications between the base station 504 and the conventional terminal device 506 is supported by a host carrier (e.g. potentially making use of the full range of transmission resources schematically represented in FIG. 4). The communication link 512 for communications between the base station 504 and the reduced-capability MTC terminal device 508 is supported by a virtual carrier (e.g. making use of resources within a restricted subset of frequency resources such as the virtual carrier schematically represented in FIG. 4). Communications between the MTC terminal device 508 and the base station 504 may generally be based on any of the previously proposed schemes for virtual carrier operation with modification as described herein to provide functionality in accordance with certain embodiments of the disclosure. For example, the MTC terminal device 508 may operate such that all control-plane and user-plane signalling from the base station 504 which is addressed to the terminal device 508 is made within the subset of frequency resources (OFDM carriers) allocated to the virtual carrier provided for the terminal device 508. Alternatively, control-plane signalling from the base station 504 which is addressed to the terminal device 508 may be made within the full-bandwidth of the control region 300 represented in FIG. 4, with higher-layer data (user-plane data) being communicated within the restricted frequency resources (OFDM carriers) allocated to the virtual carrier provided for the terminal device 508.

Figure 6:
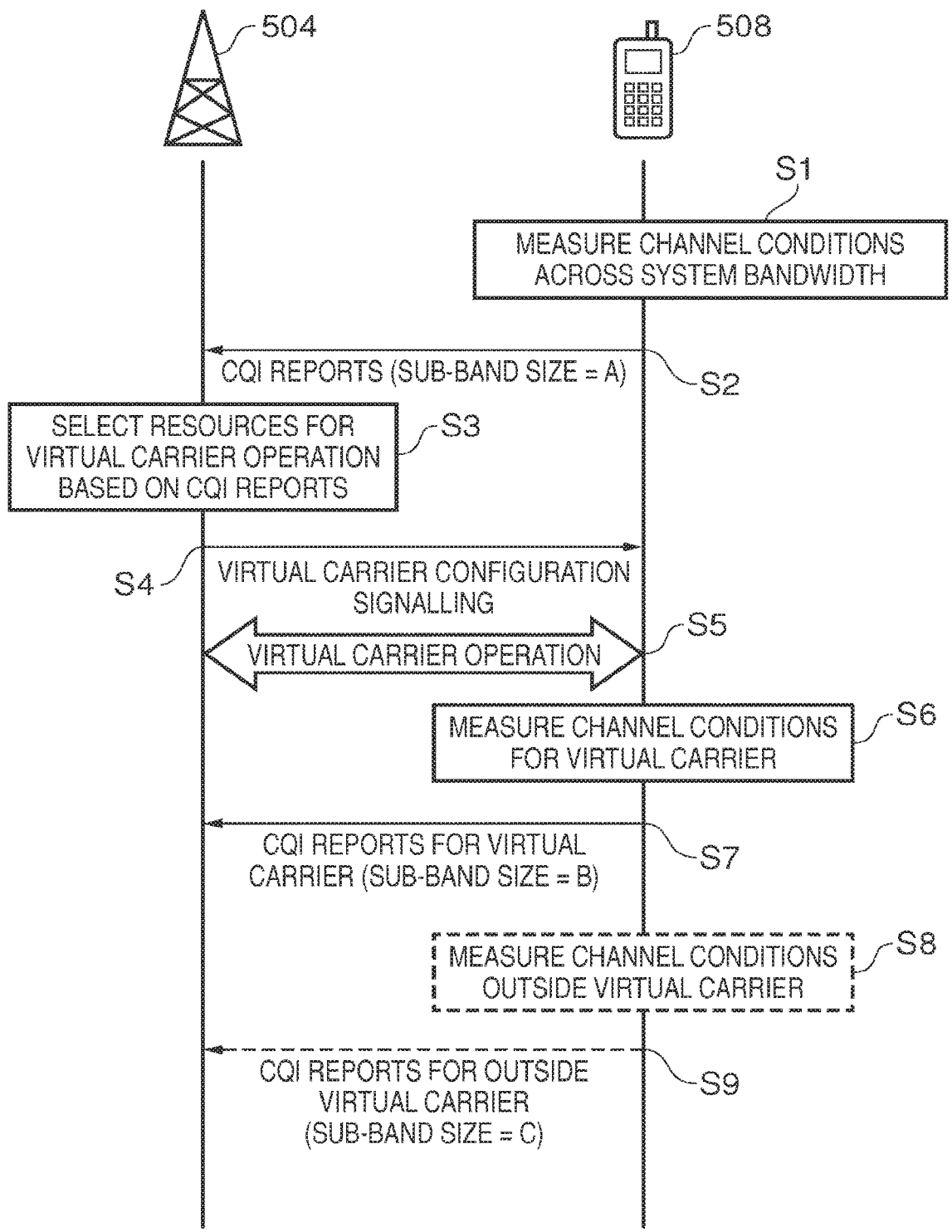
FIGS. 6 to 8 are signalling ladder-diagrams schematically representing methods of operation in accordance with certain examples of the present disclosure.

FIG. 6 is a signalling ladder diagram schematically representing modes of operation for the terminal device 508 and the base station 504 schematically represented in FIG. 5 in accordance with some embodiments of the present disclosure. In this example it is assumed the processing represented in FIG. 6 starts as the terminal device 508 is in a process of initially accessing the base station 504 prior to settling into a virtual carrier operating mode using semi-statically allocated transmission resources for supporting the virtual carrier.

In step S1 the terminal device 508 measures channel conditions across the full system bandwidth supported by the base station 504. The individual channel condition measurements may be performed in accordance with conventional techniques, for example based on conventional reference signal measurements. In situations where the terminal device is unable to simultaneously measure channel conditions across the whole system bandwidth, for example because the terminal device is configured for reduced-bandwidth operation, the terminal device may measure the channel conditions across the system bandwidth by sequentially retuning its transceiver to different parts of the system bandwidth for different subframes. Thus, step S1 results in the terminal device obtaining a plurality of measurements of channel conditions across the system bandwidth (host carrier bandwidth).

In step S2 the terminal device 508 transmits CQI reports to the base station 504. The CQI reports may be transmitted in accordance with conventional CQI reporting signalling techniques. The CQI reports are subband CQI reports (as opposed to a wideband CQI report), and in this example are associated with a subband size A (for example, corresponding to 4 physical resource blocks, PRBs). The specific frequency locations associated with the CQI reports may depend on implementation. For example, in some examples where a virtual carrier mode of operation for the terminal device may be adopted at any location within the full system bandwidth, the CQI reports may uniformly span the full system bandwidth. In other examples where the virtual carrier mode of operation for the terminal device may only be adopted at a specific subset of locations within the system bandwidth, the CQI reports may cover only these locations. In some implementations the terminal device may be configured to provide CQI reports for predefined frequency locations whereas in other implementations the terminal device may provide CQI reports for a predefined number of frequency locations associated with the particular channel conditions (e.g. in accordance with established "best M" CQI reporting techniques, or, as described further below, in accordance with an approach in which only the worst channel conditions are reported).

In step S3 the base station takes account of the CQI reports received from the terminal device in step S2 to select the most appropriate downlink transmission resources to be allocated for supporting a virtual carrier mode of operation for the terminal device 508. This process may take account of conventional techniques. For example, preference may be given to allocating downlink transmission resources associated with what are indicated by the CQI reports to be relatively good channel conditions for the terminal device, while at the same time taking account of other system constraints, for example a need to provide appropriate load balancing amongst terminal devices seeking to access the base station. The specific process adopted for selecting appropriate transmission resources for supporting the terminal device 508 on a virtual carrier is not significant to the operation of certain examples of the present disclosure.

In step S4 the base station transmits configuration signalling to the terminal device to allow the terminal device to configure itself for virtual carrier operation using the resources selected in step S3. This may be performed in accordance with known techniques for configuring virtual carrier operation in wireless telecommunications networks, for example using radio resource control (RRC) signalling.

As schematically indicated in step S5, the terminal device and the base station may then begin virtual carrier operation broadly in accordance with previously proposed techniques, except where modified as described herein.

In step S6 the terminal device 508 measures channel conditions for the transmission resources associated with the virtual carrier on which it is operating (i.e. as selected by the base station step S3 and conveyed to the terminal device in step S4). The individual channel condition measurements may be performed in accordance with conventional techniques, for example based on conventional reference signal measurements. Thus, step S6 results in the terminal device obtaining a plurality of measurements of channel conditions for the downlink transmission resources comprising the virtual carrier.

In step S7 the terminal device 508 transmits CQI reports to the base station 504. The CQI reports may be transmitted in accordance with conventional CQI reporting signalling techniques (i.e. in terms of signalling protocols and format). The CQI reports are subband CQI reports (as opposed to a wideband CQI report), and in this example are associated with a subband size B (for example, corresponding to 1 physical resource block frequency resolution). Significantly, the subband size B for the CQI reports transmitted by the terminal device on the virtual carrier in step S7 is smaller than the subband size A used for transmitting the CQI reports which are not associated with an allocated virtual carrier in step S2.

Although not shown in FIG. 6 in the interests of simplicity, the base station receiving the CQI reports reflecting channel conditions on the transmission resources associated with the virtual carrier in step S7 is configured to make scheduling decisions for downlink transmissions to the terminal device on the virtual carrier by taking account of the CQI reports. In summary, and in accordance with conventional techniques, the base station may preferentially allocate downlink transmission resources to the terminal device on transmission resources associated with good channel conditions. This scheduling may be made in accordance with conventional CQI-based scheduling techniques in wireless telecommunications systems.

The specific frequency locations associated with the CQI reports transmitted in step S7 may again depend on implementation. For example, the CQI reports may uniformly span the transmission resources comprising the virtual carrier or may comprise measurement reports for only a predefined number of frequency locations associated with the best channel conditions (i.e. in accordance with established "best M" CQI reporting techniques within the context of the virtual carrier). However, what is significant in accordance with this example implementation of an embodiment of the disclosure is that the resolution of the CQI reports transmitted for the virtual carrier in step S7 is higher than the resolution of the CQI reports transmitted for the full system bandwidth in step S2 (i.e. the subband size B associated with step S7 is less than or, equivalently, corresponds to fewer physical resource blocks than, the subband size A associated with Step S2).

Or the subband size B associated with step S7 is larger than or, equivalently, corresponds to more physical resource blocks than, the subband size A associated with Step S2

Steps S8 and S9 are represented in FIG. 6 using dashed lines to indicate they are optional aspects of this example embodiment of the present disclosure.

In step S8 the terminal device 508 measures channel conditions outside the virtual carrier (i.e. channel conditions for downlink transmission resources not comprising the currently-allocated virtual carrier). The individual channel condition measurements may again be performed in accordance with conventional techniques, for example based on conventional reference signal measurements. In situations where the terminal device is unable to simultaneously measure channel conditions across the whole system bandwidth, for example because the terminal device is configured for reduced-bandwidth operation, the terminal device may measure the channel conditions across the system bandwidth by sequentially retuning its transceiver to different parts of the system bandwidth in different subframes as required to achieve the desired frequency coverage. Thus, step S8 results in the terminal device obtaining a plurality of measurements of channel conditions across the system bandwidth (host carrier bandwidth) at frequency locations which are outside the current virtual carrier operation.

In step S9 the terminal device 508 transmits CQI reports to the base station 504. The CQI reports may again be transmitted in accordance with conventional CQI reporting signalling techniques (e.g. in terms of signalling format/protocols). The CQI reports are again subband CQI reports, and in this example are associated with a subband size C (for example, corresponding to 4 physical resource blocks, PRBs). Significantly, the subband size C for the CQI reports transmitted by the terminal device in step S9 is larger than the subband size B used for transmitting the CQI reports for the virtual carrier in step S7. The subband size C for the CQI reports transmitted in step S9 might be larger, smaller or (as in this example) the same as the subband size A for the CQI reports transmitted in step S2. In some implementations the subband size C (and/or the subband size A) might correspond with the bandwidth of the virtual carrier transmission resources, for example 6 PRBs.

The specific frequency locations associated with the CQI reports in Step S9 may again depend on implementation. For example, in some examples where a virtual carrier mode of operation for the terminal device may be adopted at any location within the full system bandwidth, the CQI reports may uniformly span the full system bandwidth. In other examples where the virtual carrier mode of operation for the terminal device may only be adopted at a specific subset of locations within the system bandwidth, the CQI reports may cover only these locations. In some implementations the terminal device may be configured to provide CQI reports for predefined frequency locations whereas in other implementations the terminal device may provide CQI reports for a predefined number of frequency locations associated with the best channel conditions (i.e. in accordance with established "best M" CQI reporting techniques). In yet other examples, such as discussed further below, the terminal device may provide CQI reports for a predefined number of frequency locations associated with the worst (relatively poorest) channel conditions (i.e. in accordance with might be referred to here as "worst M" CQI reporting techniques in contrast to the known approach of "best M" CQI reporting techniques).

Although not shown in FIG. 6 in the interests of simplicity, the base station receiving the CQI reports reflecting channel conditions on the transmission resources outside the virtual carrier in step S9 is configured to make decisions on whether to reconfigure the virtual carrier for the terminal device (i.e. select different transmission resources to support the virtual carrier for the terminal device) based on this information. For example, if the CQI reports for frequency locations outside the virtual carrier indicate a particular frequency location is associated with particularly good channel conditions for the terminal device, the base station may elect to reconfigure the transmission resources for the virtual carrier operation associated with the terminal device to use those transmission resources. To implement this the base station may in effect be configured to repeat a process corresponding to steps S3 and S4 as discussed above to continually monitor which transmission resources would provide the optimum virtual carrier operation for the terminal device based on CQI reports obtained from outside the current virtual carrier. To avoid overly frequent reconfiguration of the virtual carrier, the transmission resources associated with the currently configured virtual carrier for a terminal device might be maintained unless a reconfiguration would provide an improvement above at least a threshold amount (e.g. determined in terms of a predicted maximum data rate that could in principle be supported according to the measured channel conditions, or in terms of a predicted received signal power or quality at the terminal device according to the measured channel conditions).

For the approach represented in FIG. 6, the steps S8 and S9 might not be performed in some implementations. That is to say, the terminal device may be configured to transmit CQI reports for transmission resources which are not currently allocated to a virtual carrier by virtue of the non-virtual carrier CQI reports being transmitted before the virtual carrier is configured for the terminal device. In addition, and as noted in steps S8 and S9, in some implementations the terminal device may be configured to transmit relatively low resolution CQI reports for transmission resources which are not allocated to a virtual carrier after the virtual carrier has been configured. Thus, CQI reports for both on and off the virtual carrier may be transmitted simultaneously/in parallel with different frequency resolutions. In this regard, although steps S8 and S9 are represented separately from steps S6 and S7 in FIG. 6, the corresponding steps may be performed at the same time. In some example implementations, steps corresponding to steps S8 and S9 might be performed, or a step corresponding to steps S1, S2 and S3 might not be performed (or corresponding steps may be performed without the restriction of the subband size A being greater than the subband size B).

Thus, in accordance with certain embodiments of the present disclosure a wireless telecommunications system is configured such that a terminal device transmits CQI reports both for downlink transmission resources associated with a virtual carrier and for downlink transmission resources not associated with a virtual carrier, but with a higher reporting resolution being used for the CQI reports associated with the virtual carrier. The CQI reports not associated with the virtual carrier may be transmitted before the virtual carrier is configured, and hence before the CQI reports associated with the virtual carrier are transmitted. Alternatively, or in addition, CQI reports not associated with the virtual carrier may be transmitted in parallel with CQI reports associated with the virtual carrier (hence after the virtual carrier is established).

CQI reporting for the virtual carrier may be used by the base station in accordance with conventional techniques for optimising scheduling decisions with respect to downlink transmissions to the terminal device on the virtual carrier. In this regard the higher-resolution CQI reporting on the virtual carrier can help to optimise this process. CQI reporting outside the virtual carrier may be used by the base station, again in accordance with broadly conventional techniques, for determining an appropriate virtual carrier configuration. This may be performed to establish an initial virtual carrier configuration for the terminal device (e.g. as schematically represented in steps S1, S2 and S3) in FIG. 6, or may be performed while the terminal device is already operating on a virtual carrier to determine if it would be advantageous to reconfigure the virtual carrier to use different downlink transmission resources, e.g. because of changing channel conditions (e.g. as schematically represented in steps S8 and S9 of FIG. 6). In this regard the decision on what are the most appropriate transmission resources to support virtual carrier operation for a terminal device will typically benefit less from higher resolution CQI reporting, and so relatively-low resolution CQI reporting may be used outside the virtual carrier to help reduce the associated signalling overhead. In summary, the inventors have recognised the purpose of the CQI reporting inside and outside a virtual carrier can be different, and this means different CQI reporting resolutions may be appropriate in respect of downlink transmission resources comprising a virtual carrier and downlink transmission resources not comprising a virtual carrier. Generally, CQI reporting resolution corresponding to the downlink transmission allocation resolution might be most appropriate for on virtual carrier reporting (e.g. CQI reporting resolution of 1 PRB), whereas CQI reporting resolution corresponding to a bandwidth of the virtual carrier might be most appropriate for off virtual carrier reporting (e.g. CQI reporting resolution of 6 PRB in a case where the virtual carrier bandwidth corresponds to 6 PRB). In other examples, the resolution of the CQI reporting may be also different of that used by non-MTC type devices such as smart phones, which use a resolution which is designed to balance overhead with a frequency of transmission of the CQI reports and which is independent of any virtual carrier allocated resources.

The subband sizes to be used by a terminal device at any given time may, for example, be conveyed in system information transmitted by the base station e.g. in association with conventional system information block, SIB, transmissions, or may be predefined. For example, the terminal device may be configured to derive the relevant subband sizes according to defined standards, e.g. based on predefined values or values derived from other system parameters, such as the system bandwidth and/or the virtual carrier bandwidth. The wireless telecommunications system may be configured so the terminal device switches to the high-resolution CQI reporting for transmission resources associated with the virtual carrier under instruction from the base station or automatically (since the terminal device is aware which transmission resources comprise the virtual carrier, it can configure the subband size for the associated CQI reporting accordingly). In some implementations the terminal device itself may be configured to select the most appropriate subband sizes for CQI reporting, for example based on observed variations in measure channel conditions with frequency.

Although the above description of FIG. 6 has primarily focused on adopting different frequency resolutions for CQI reporting on (in) a virtual carrier and off (outside) a virtual carrier, it will be appreciated the same principles can be applied for the temporal resolution of CQI reporting. That is to say, in an alternative to the approach represented in FIG. 6, the CQI reports corresponding to those transmitted in steps S2, S7 and S9 of FIG. 6 may instead of (or in addition to) being transmitted with different subband sizes, be transmitted with different temporal resolutions. For example, CQI reporting outside the virtual carrier (in steps corresponding to steps S2 and/or S9 in FIG. 6) may be transmitted less frequently than CQI reporting inside the virtual carrier (in a step corresponding to step S7 in FIG. 6).

Figure 7:
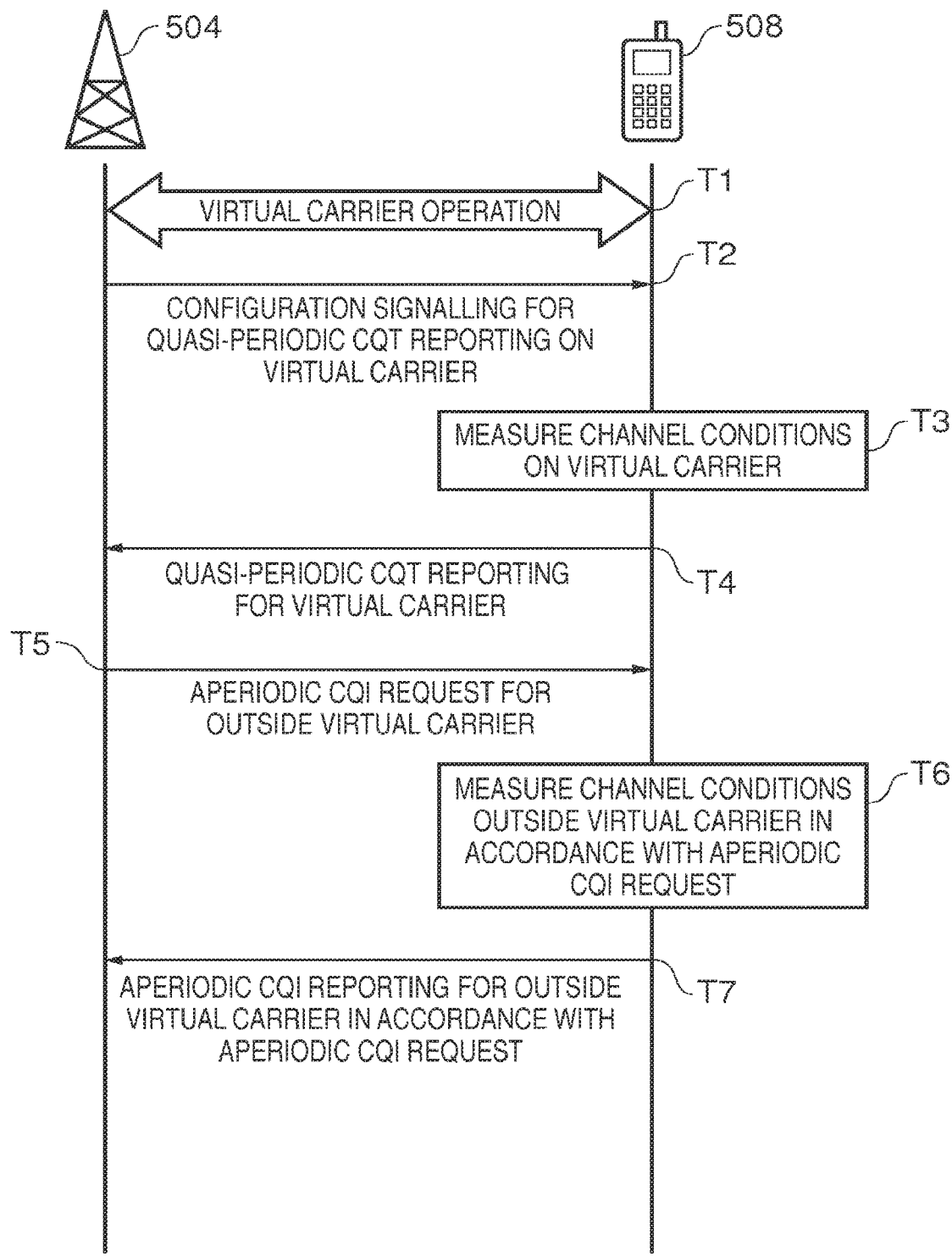

FIG. 7 is a signalling ladder diagram schematically representing modes of operation for the terminal device 508 and the base station 504 schematically represented in FIG. 5 in accordance with some other embodiments of the present disclosure. In this example it is assumed the processing represented in FIG. 7 starts when the terminal device 508 and the base station 504 have previously established a mode of virtual carrier operation, as schematically represented in step T1.

A significant aspects of the example implementation represented in FIG. 7 is the provision of both on-and off-virtual carrier CQI reporting, but with on-virtual carrier CQI reporting being performed (quasi-)periodically and off-virtual carrier CQI reporting being performed aperiodically.

In wireless telecommunications systems, such as LTE-based telecommunications systems, it is known to provide two different reporting mechanisms in terms of when CQI reports are transmitted. One mechanism is periodic CQI reporting and the other is aperiodic CQI reporting. For periodic CQI reporting a reporting interval is configured by RRC signalling in advance and a terminal device transmits CQI reports on a repeating cycle according to this configuration. Aperiodic CQI reporting, on the other hand, is an approach in which a base station specifically requests a terminal device to send a CQI report when the base station wants to receive this information. Aperiodic CQI reporting is performed in LTE on the physical uplink shared channel, PUSCH. Periodic CQI reporting is performed in LTE either on the physical uplink control channel, PUCCH, or, in the event the terminal device is scheduled to transmit other data in the same subframe, on the physical uplink shared channel, PUSCH. As already noted, further information on the established practices for CQI reporting can be found, for example, in the relevant standards, such as ETSI TS 136 213 V11.4.0 (2013-10) [13].

For reduced capability device operation, for example for MTC devices, on virtual carriers, it may be considered preferable for CQI reporting to be constrained to PUSCH rather than use PUCCH. This is because of the limited availability of PUCCH resources in conjunction with what might be relatively large numbers of reduced capability terminal devices operating in a given cell. However, although it may be preferable for virtual carrier CQI reporting to be constrained to PUSCH, which is primarily associated with aperiodic CQI reporting, the inventors have recognised periodic CQI reporting, which is primarily associated with PUCCH, may still be desirable for terminal devices operating on a virtual carrier. For example, where relatively frequent CQI reporting is desired because of fast fading, a periodic CQI reporting approach would help provide the base station with regular channel state information without the additional base station signalling overhead associated aperiodic CQI reporting. With this in mind, an approach is proposed in which a terminal device operating on a virtual carrier may be configured to transmit CQI reports periodically in respect of downlink transmission resources associated with the virtual carrier. In some respects this approach may be referred to as quasi-periodic CQI reporting. The approach may further include transmitting CQI reports aperiodically in respect of downlink transmission resources not associated with the virtual carrier. The periodic CQI reporting in respect of downlink transmission resources associated with the virtual carrier may be made on a physical uplink shared channel, for example PUSCH in LTE. A significant aspect of this operation in accordance with some implementations involves uplink transmission resources on the physical uplink shared channel in a subframe being reserved for use by the terminal device for CQI reporting without the terminal device receiving a specific uplink resource allocation in respect of that specific subframe. Instead, the terminal device receives an initial configuration message for CQI reporting to be made periodically on the physical uplink shared channel which indicates which uplink resources in which subframes are to be used for CQI reporting. Accordingly, the terminal device can be configured for what might be termed quasi-periodic CQI reporting using a physical uplink shared channel in a manner which does not require a base station to transmit resource allocation signalling in respect of each and every subframe in which the quasi-periodic CQI reporting is to be transmitted on a physical uplink shared channel.

Thus, returning to FIG. 7, in step T2 the base station 504 transmits configuration signalling for quasi-periodic CQI reporting in respect of transmission resources associated with the virtual carrier to the terminal device 508. This signalling may be made in accordance with general RRC configuration signalling techniques. In accordance with certain embodiments of the present disclosure, the configuration signalling received by the terminal device in step T2 conveys one or more of an indication of a timing interval (period) to be used for CQI reporting on the virtual carrier, an indication of a subband size to be used for the periodic CQI reporting, an absolute timing reference to be used for the periodic CQI reporting (for example in terms of system frame number for the first report), and an indication of the uplink transmission resources on the physical uplink shared channel to be used for conveying the CQI reports in the respective subframes. Having conveyed this configuration information to the terminal device, the base station reserves the relevant uplink transmission resources for use by the terminal device in the relevant subframes. Thus, the terminal device is in effect granted allocation resources on the physical uplink shared channel to use for CQI reporting for a plurality of subframes without requiring individual dedicated uplink transmission resource allocation messages to be conveyed from the base station to the terminal device for each of the individual subframes.

In step T4 the terminal device 508 measures channel conditions for the transmission resources associated with the virtual carrier on which it is operating. These channel conditions are measured in accordance with the periodic CQI reporting configuration received in step T2. That is to say, the terminal device is configured to measure the channel conditions in the respective frequency ranges and subframes required to support the configured CQI reporting. The individual channel condition measurements may be performed in accordance with conventional techniques, for example based on conventional reference signal measurements. Thus, step T4 results in the terminal device obtaining a plurality of measurements of channel conditions for the downlink transmission resources comprising the virtual carrier.

In step T5 the terminal device 508 transmits CQI reports to the base station 504. These CQI reports are transmitted in the relevant subframes and using the relevant uplink transmission resources associated with the periodic CQI configuration signalling received in step T2. These CQI reports may be made generally in accordance with conventional CQI reporting signalling techniques in terms of signalling protocols and format, but significantly, they are transmitted on physical uplink shared channel transmission resources that have not been specifically allocated in respect of the specific subframe in which the CQI reports are made, but rather have been allocated in advance for a plurality of subframes, as discussed above.

Although not shown in FIG. 7 in the interests of simplicity, the base station receiving the CQI reports reflecting channel conditions on the transmission resources associated with the virtual carrier in step T5 is configured to make scheduling decisions for downlink transmissions to the terminal device on the virtual carrier by taking account of the CQI reports. In summary, and in accordance with conventional techniques, the base station may preferentially allocate downlink transmission resources to the terminal device on transmission resources associated with good channel conditions. This scheduling may be made in accordance with conventional CQI-based scheduling techniques in wireless telecommunications systems.

The specific frequency locations associated with the CQI reports transmitted in step T5 may again depend on implementation. For example, the CQI reports may uniformly span the transmission resources comprising the virtual carrier or may comprise measurement reports for only a predefined number of frequency locations associated with particular channel conditions (e.g. generally in accordance with established "best M" CQI reporting techniques).

In step T5 of the procedure schematically represented in FIG. 7 the base station conveys a conventional aperiodic CQI reporting request to the terminal device in respect of transmission resources which are outside the virtual carrier. The base station may do this, for example, because it has observed the channel conditions within the virtual carrier have deteriorated, and the base station wishes to determine if there are other transmission resources associated with better channel conditions which the virtual carrier could be reconfigured to use. That is to say, the base station 504 may determine that it is appropriate to decide whether or not to reallocate the downlink transmission resources being used to support virtual carrier for the terminal device 508.

In step T6, the terminal device 508 measures channel conditions outside the virtual carrier in accordance with the aperiodic CQI reporting request received in step T5. The individual channel condition measurements may again be performed in accordance with conventional techniques, for example based on conventional reference signal measurements. In situations where the terminal device is unable to simultaneously measure channel conditions across the whole system bandwidth, the terminal device may sequentially retune its transceiver to measure the channel conditions at different frequency locations across the system bandwidth to achieve the desired frequency coverage.

In step T7 the terminal device 508 transmits CQI reports to the base station 504 in accordance with the aperiodic CQI reporting requests received in step T5. This CQI reporting may be transmitted in accordance with conventional aperiodic CQI reporting signalling techniques (e.g. in terms of signalling format/protocols). The specific frequency locations associated with the CQI reports in Step T9 may again depend on implementation and may, for example, follow any conventional aperiodic CQI reporting techniques. Thus, in some implementations the terminal device may be configured to provide CQI reports for predefined frequency locations whereas in other implementations the terminal device may provide CQI reports for a predefined number of frequency locations associated with the best channel conditions (i.e. in accordance with established "best M" CQI reporting techniques). In yet other examples, such as discussed further below, the terminal device may provide CQI reports for a predefined number of frequency locations associated with the worst (relatively poorest) channel conditions.

Although not shown in FIG. 7 in the interests of simplicity, the base station receiving the CQI reports in response to its aperiodic CQI reporting request in respect of downlink transmissions outside the virtual carrier is configured to make decisions on whether to reconfigure the virtual carrier for the terminal device (i.e. select different transmission resources to support the virtual carrier for the terminal device) based on this information. For example, if the CQI reports for frequency locations outside the virtual carrier indicate a particular frequency is associated with particularly good channel conditions for the terminal device, the base station may elect to reconfigure the transmission resources for the virtual carrier operation associated with the terminal device to use those transmission resources.

Thus, the approach of FIG. 7 provides a scheme in which a terminal device operating on a virtual carrier can in effect provide periodic CQI reporting in respect of downlink transmissions associated with the virtual carrier, while providing aperiodic CQI reporting in respect of downlink transmissions not associated with the virtual carrier. The CQI reporting for the virtual carrier may be made using uplink resources on a physical uplink shared channel which are configured for use by the terminal device in a single configuration step which is applicable for a plurality of subframes (i.e. without the terminal device receiving a plurality of dedicated uplink resource allocation grants, one in respect of each subframe in which periodic CQI reporting is to be undertaken on the physical uplink shared channel). This can help ensure the base station receives regular CQI reports from the terminal device to allow optimised scheduling decisions in respect of downlink transmission is to the terminal device to be made in accordance with conventional channel-condition based scheduling techniques, while at the same time avoiding the need for repeated uplink resource allocation signalling from the base station, and also without requiring resources on a physical uplink control channel to be reserved for periodic CQI reporting.

Figure 8:
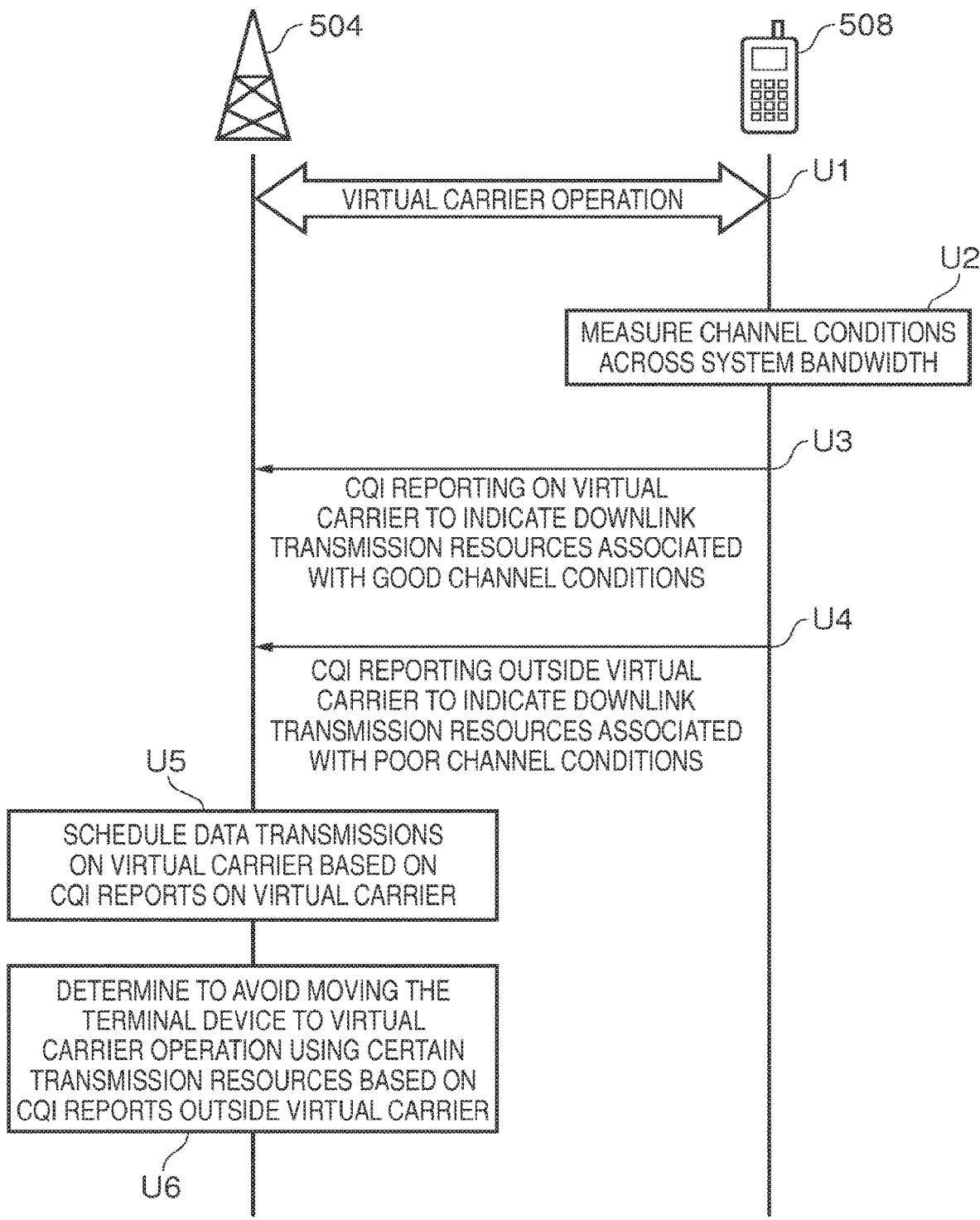

FIG. 8 is a signalling ladder diagram schematically representing modes of operation for the terminal device 508 and the base station 504 schematically represented in FIG. 5 in accordance with some other embodiments of the present disclosure. In this example it is assumed the processing represented in FIG. 8 starts when the terminal device 508 and the base station 504 have previously established a mode of virtual carrier operation, as schematically represented in step U1.

A significant aspects of the example implementation represented in FIG. 8 is the provision of CQI reporting in respect of downlink transmissions which are not currently associated a current virtual carrier, whereby the terminal device measures channel conditions for a plurality of frequency bands outside the virtual carrier, and determines a selected subset of the frequency bands which are associated with relatively poor channel conditions, and provides CQI reports for this selected subset of frequency bands. That is to say, the terminal device is configured to provide the base station with an indication of the transmission resources associated with relatively bad channel conditions, as opposed to relatively good channel conditions. CQI reporting for a selected subset of channel conditions determined to have relatively good channel conditions is a known approach referred to as "best M" CQI reporting. What is proposed with the approach of FIG. 8 is what might be conversely referred to as "worst M" CQI reporting.

The conventional "best M" CQI reporting approach is employed to reduce the amount of CQI signalling by transmitting only CQI reports for frequency resources currently associated with the best channel conditions. The underlying principle is that the base station scheduling decisions are based on algorithms such as proportional fairness and/or max C/I scheduling calculations. In this regard it is most helpful for the base station to know which transmission resources are associated with the best channel conditions for the terminal device in order to seek to optimise overall spectral efficiency. Because typical scheduling algorithms mean the base station will seek to avoid scheduling downlink transmissions on frequency resources associated with poor channel conditions for a terminal device, the base station generally does not care about the measured channel conditions for the poorly performing channels, and so there is no need for the terminal device to report them. Basically, the scheduler operates on the principle that if a particular downlink transmission resources is not associated with the "best M" CQI reports received from the terminal device, the channel conditions on that particular downlink transmission resource are such that it should be avoided for scheduling downlink transmission is for the terminal device. Accordingly, the "best M" CQI reporting approach works well to allow base station scheduling to be optimised with a reduced signalling overhead (because the terminal device only transmits CQI reports associated with a selected subset of the channel condition measurements has made).

However, the inventors have recognised that in a virtual carrier context in which a terminal device is providing CQI reports in respect of downlink transmissions which are outside the virtual carrier, it can in some cases be helpful for the terminal device to provide the base station with an indication of the worst performing channels as opposed to the best performing channels. For example, in a wireless telecommunications system which supports virtual carrier operations on a plurality of different virtual carrier frequencies/transmission resources, an approach of preferentially providing CQI reporting in respect of downlink transmission resources associated with relatively poor channel conditions for a particular terminal device can be helpful for load balancing. For example, if a wireless telecommunications system supports N virtual carriers and the traffic load on a particular virtual carrier is relatively high, the base station may wish to move some terminal devices from the virtual carrier associated with the high traffic load to another virtual carrier. In effect, the base station may wish to reconfigure the downlink transmission resources used to support virtual carrier operation for a given terminal device so as to move the terminal device from one virtual carrier to another. In this situation it can be more helpful for the base station to know which of the potential downlink transmission resources that could be used to support virtual carrier operations for the terminal device are currently associated with what are determined to be unacceptable channel conditions. That is to say, it can be more helpful for the base station to know which transmission resources are associated with poor channel conditions rather than which transmission resources are associated with good channel conditions.

Thus, returning to FIG. 8, in step U2 the terminal device 508 in this example implementation measures channel conditions across the full system bandwidth supported by the base station 504. The actual channel condition measurements may be performed in accordance with conventional techniques, for example based on conventional reference signal measurements. In situations where the terminal device is unable to simultaneously measure channel conditions across the whole system bandwidth, for example because the terminal device is configured for reduced-bandwidth operation, the terminal device may measure the channel conditions across the system bandwidth by sequentially retuning its transceiver to different parts of the system bandwidth for different subframes. Thus, step S2 results in the terminal device obtaining a plurality of measurements of channel conditions across the system bandwidth, including channel condition measurements for transmission resources associated with the current virtual carrier for the terminal device and channel condition measurements for resources not associated with the terminal device's current virtual carrier.

In steps U3 and U4 the terminal device 508 transmits CQI reports to the base station 504 derived from the channel condition measurements made in step U2. The CQI reports for channel condition measurements associated with the virtual carrier are shown in a step U3 and the CQI reports for channel condition measurements not associated with the virtual carrier are shown in a step U4.

The CQI reports for downlink transmissions associated with the transmission resources comprising the current virtual carrier for the terminal device may be transmitted in accordance with conventional CQI reporting signalling techniques (i.e. in terms of signalling protocols and format). These CQI reports are used by the base station to help scheduling decisions for downlink transmissions for the terminal device on the virtual carrier, as schematically represented in step U5 of FIG. 8. This may be performed generally in accordance with conventional techniques. In this this particular example it is assumed the virtual carrier CQI reporting in step U3 adopts a conventional "best M" approach. That is to say, the terminal device is configured to transmit a predefined number, M, of CQI reports associated with the transmission resources deemed to be associated with the best M channel conditions measured for transmission resources comprising the virtual carrier in step U2.

The CQI reports for downlink transmissions not associated with the transmission resources comprising the current virtual carrier for the terminal device may again be transmitted in accordance with conventional CQI reporting signalling techniques in terms of signalling protocols and format. However, in accordance with certain embodiments of the present disclosure, the CQI reporting in step U4 is based on a selected subset of the measured channel conditions, and in particular, the measured channel conditions determined to be associated with relatively poor channel conditions. That is to say, the terminal device is configured to transmit a predefined number, M, of CQI reports associated with the transmission resources deemed to be associated with the worst M channel conditions measured for the transmission resources not comprising the virtual carrier in step U2. (It will be appreciated the value of M need not be the same for the CQI reporting inside and outside the virtual carrier). This "worst M" CQI reporting approach may generally follow the same approach as conventional "best M" CQI reporting, except the selection of the subset of downlink transmission resources in respect of which CQI reporting is to be made is based on the worst, as opposed to the best, channel conditions.

The CQI reporting identifying the "worst M" channels may be used by the base station to avoid reconfiguring the downlink transmission resources comprising the virtual carrier for the terminal device to use transmission resources associated with poor channel conditions, as schematically represented in step U6 in FIG. 8. For example, the base station may undertake step U6 as part of a load balancing exercise to determine whether it is appropriate to move the terminal device 508 to a different virtual carrier, and if so, which of the potential virtual carriers should be avoided because they are associated with bad channel conditions for the terminal device.

It will be appreciated the approach represented in FIG. 8 represents only one example of how "worst M" channel condition reporting may be implemented and there are many variations that can be made.

For example, in some circumstances the terminal device might only measure channel conditions within the virtual carrier in a step otherwise corresponding to step U2 in FIG. 8 and provide corresponding CQI reporting in a step corresponding to step U3. That is to say, the terminal device might not routinely measure channel conditions outside the virtual carrier and provide corresponding CQI reporting to indicate the transmission resources associated with poor channel conditions. Instead, the measurement of channel conditions outside the virtual carrier and the corresponding CQI reporting schematically represented in step U4 in FIG. 8 may be made in response to a specific request from the base station. For example, the base station may be configured to use RRC signalling to configure the terminal device 508 to begin CQI reporting indicating the transmission resources with poor channel conditions outside the virtual carrier when the base station determines that load balancing should be undertaken, for example because one particular virtual carrier has become associated with a disproportionate amount of traffic.

In yet other circumstances, the terminal device might be configured to measure channel conditions across the full system bandwidth, as schematically represented in step U2 of FIG. 8, and to provide CQI reporting in respect of downlink transmission resources comprising the virtual carrier, as schematically represented in step U3 of FIG. 8. However, rather than provide CQI reporting indicating the worst M channels in step U4 of FIG. 8, the base station may instead be configured to initially provide CQI reporting indicating the best M channels. This can help allow the base station to determine whether the terminal device should be moved to another virtual carrier with a view to providing the terminal device with an overall improvement in channel conditions. However, the base station may be configured to use RRC signalling to configure the terminal device 508 to switch to CQI reporting indicating the transmission resources determined to have relatively poor channel conditions outside the virtual carrier (instead of those associated with good channel conditions) when the base station determines that load balancing should be undertaken. When the load balancing exercise is complete, the base station may reconfigure the terminal device to switch back to CQI reporting that indicates the transmission resources outside the virtual carrier which are determined to be associated with relatively good channel conditions.

In some cases, rather than the terminal device deriving an indication of the "worst M" channel conditions for transmission resources outside the virtual carrier, the terminal device may be configured to instead simply indicate which transmission resources/potential virtual carriers are currently providing what are deemed to be unacceptable channel conditions (e.g. channel conditions not satisfying a minimum quality threshold). The base station can take account of this when load balancing by avoiding moving terminal devices to virtual carriers associated with downlink transmission resources which the terminal device has indicated would provide unacceptable channel conditions.

Thus, an approach such as represented in FIG. 8 can help a base station in balancing the traffic load among a plurality of potential virtual carriers in a manner that can help to avoid moving a particular terminal device to a virtual carrier that provides poor channel conditions for the terminal device.

It will be appreciated the various modes of operation described above with reference to FIGS. 6, 7 and 8 may be combined together in some implementations in accordance with embodiments of the present disclosure. For example, in some implementations a base station and a terminal device operating on a virtual carrier supported by the base station may be configured to operate with CQI reporting by the terminal device being provided across a full system bandwidth, but with higher resolution CQI reporting resolution for the virtual carrier as compared to CQI reporting outside the virtual carrier, as discussed above reference to FIG. 6, with the virtual carrier CQI reporting provided quasi-periodically, such as discussed above reference to FIG. 7, and the off-virtual carrier CQI reporting may be provided aperiodically. Furthermore, the system may or may not be configured to implement the principles discussed above reference to FIG. 8, whereby the terminal device may be configured to provide CQI reporting outside the virtual carrier which indicates the transmission resources associated with relatively poor channel conditions (e.g. the "worst M" channel conditions). In some cases the principles described above with reference to FIG. 6 may not be adopted in an implementation which operates in accordance with the principles described above with reference to both FIGS. 7 and 8.

More generally, it will be appreciated that embodiments of the present disclosure may comprise various features as described herein in any appropriate combination.

Thus there has been described a wireless telecommunications system comprises a base station and a terminal device. The system supports a virtual carrier mode of operation in which downlink communications are made by the base station using a radio interface that spans a system frequency bandwidth while the terminal device is configured to receive at least some communications from the base station within a restricted subset of transmission resources selected from within the system frequency bandwidth to provide a restricted bandwidth downlink. The terminal device is configured to measure channel conditions across the system frequency bandwidth and transmit corresponding measurement reports to the base station. The frequency and/or time resolution of the measurement reports may be greater for transmission resources comprising the restricted bandwidth downlink channel than for transmission resources non comprising the restricted bandwidth downlink channel. The measurement reports for transmission resources not comprising the restricted bandwidth downlink channel may be aperiodic while the measurement reports for transmission resources comprising the restricted bandwidth downlink channel may be periodic. The measurement reports for transmission resources not comprising the restricted bandwidth downlink channel may be based on a subset of the channel condition measurements selected because they are associated with relatively poor channel conditions.

Some respective features of the present disclosure are defined by the following numbered paragraphs:

1. A method of operating a terminal device in a wireless telecommunications system in which downlink communications are made by a base station using a radio interface that spans a system frequency bandwidth and the terminal device is configured to receive at least some communications from the base station within a restricted subset of transmission resources selected from within the system frequency bandwidth and comprising a restricted bandwidth downlink channel having a channel bandwidth which is smaller than the system frequency bandwidth, the method comprising:

measuring channel conditions across the system frequency bandwidth; and transmitting to the base station channel condition measurement reports for a plurality of frequencies across the system frequency bandwidth, wherein a resolution of the measurement reports in the time and/or frequency domain for transmission resources not comprising the restricted bandwidth downlink channel is less than a resolution of the measurement reports in the time and/or frequency domain for transmission resources comprising the restricted bandwidth downlink channel.

2. The method according to clause 1, wherein the measurement reports for transmission resources not comprising the restricted bandwidth downlink channel are transmitted before the transmission resources comprising the restricted bandwidth downlink channel have been defined for use by the terminal device.

3. The method according to clauses 1 or 2, wherein the transmission resources comprising the restricted bandwidth downlink channel for the terminal device are defined based on the measurement reports for transmission resources not comprising the restricted bandwidth downlink channel.

4. The method according to clauses 1, 2 or 3, wherein the measurement reports for transmission resources comprising the restricted bandwidth downlink channel and the measurement reports for transmission resources not comprising the restricted bandwidth downlink channel are both transmitted by the terminal device after the transmission resources comprising the restricted bandwidth downlink channel have been defined for use by the terminal device.

5. The method according to clauses 1 to 4, wherein the transmission resources comprising the restricted bandwidth downlink channel for the terminal device are redefined based on the measurement reports.

6. The method according to clauses 1 to 5, further comprising the terminal device determining the resolution for a measurement report for transmission resources not comprising the restricted bandwidth downlink channel and/or the resolution for measurement reports for transmission resources comprising the restricted bandwidth downlink channel based on information received from the base station.

7. The method according to clause 6, wherein the terminal device receives information from the base station regarding the resolution for measurement reports for transmission resources comprising the restricted bandwidth downlink channel in association with signalling received from the base station with which the transmission resources comprising the restricted bandwidth downlink channel are defined for use by the terminal device.

8. The method according to clauses 1 to 7, further comprising the terminal device determining the resolution for measurement reports for transmission resources not comprising the restricted bandwidth downlink channel and/or the resolution for measurement reports for transmission resources comprising the restricted bandwidth downlink channel based on a variability in measured channel conditions across the system frequency bandwidth.

9. The method according to clauses 1 to 8, wherein measurement reports for transmission resources not comprising the restricted bandwidth downlink channel are associated with a subset of the measurements of channel conditions made for transmission resources not comprising the restricted bandwidth downlink channel, wherein the subset is selected to comprise measurement reports for transmission resources associated with poor channel conditions.

10. The method according to clauses 1 to 9, wherein measurement reports for transmission resources not comprising the restricted bandwidth downlink channel are transmitted aperiodically and measurement reports for transmission resources comprising the restricted bandwidth downlink channel are transmitted periodically.

11. The method according to clauses 1 to 10, wherein measurement reports for transmission resources comprising the restricted bandwidth downlink channel are transmitted periodically using transmission resources on a physical uplink shared channel of the wireless telecommunications system.

12. The method according to clause 11, wherein the radio interface has a radio frame structure comprising a plurality of radio subframes, and wherein the method further comprises receiving an allocation message from the base station which indicates resources on the physical uplink shared channel to be used for transmitting measurement reports for a plurality of subframes.

13. A terminal device for use in a wireless telecommunications system in which downlink communications are made by a base station using a radio interface that spans a system frequency bandwidth and the terminal device is configured to receive at least some communications from the base station within a restricted subset of transmission resources selected from within the system frequency bandwidth and comprising a restricted bandwidth downlink channel having a channel bandwidth which is smaller than the system frequency bandwidth, wherein the terminal device is configured to:
measure channel conditions across the system frequency bandwidth; and
transmit to the base station channel condition measurement reports for a plurality of frequencies across the system frequency bandwidth, wherein the resolution of the measurement reports in the frequency and/or time domain for transmission resources not comprising the restricted bandwidth downlink channel is less than the resolution of the measurement reports in the frequency and/or time domain for transmission resources comprising the restricted bandwidth downlink channel.

14. A wireless telecommunications system comprising the terminal device according to clause 13 and a base station.

15. A method of operating a base station in a wireless telecommunications system in which downlink communications are made by the base station using a radio interface that spans a system frequency bandwidth and the base station is configured to transmit at least some communications to a terminal device within a restricted subset of transmission resources selected from within the system frequency bandwidth and comprising a restricted bandwidth downlink channel having a channel bandwidth which is smaller than the system frequency bandwidth, the method comprising receiving from the terminal device channel condition measurement reports for a plurality of frequencies across the system frequency bandwidth, wherein the resolution of the measurement reports in the frequency and/or time domain for transmission resources not comprising the restricted bandwidth downlink channel is less than the resolution of the measurement reports in the frequency and/or time domain for transmission resources comprising the restricted bandwidth downlink channel.

16. The method according to clause 15, further comprising the base station scheduling data transmissions for the terminal device on the transmission resources comprising the restricted bandwidth downlink channel in dependence on the measurement reports for the transmission resources comprising the restricted bandwidth downlink channel.

17. The method according to clause 15, further comprising the base station determining the transmission resources comprising the restricted bandwidth downlink channel for the terminal device should be changed based on the measurement reports.

18. A base station for use in a wireless telecommunications system in which downlink communications are made by the base station using a radio interface that spans a system frequency bandwidth and the base station is configured to transmit at least some communications to a terminal device within a restricted subset of transmission resources selected from within the system frequency bandwidth and comprising a restricted bandwidth downlink channel having a channel bandwidth which is smaller than the system frequency bandwidth, wherein the base station is configured to receive from the terminal device channel condition measurement reports for a plurality of frequencies across the system frequency bandwidth, wherein the resolution of the measurement reports in the frequency and/or time domain for transmission resources not comprising the restricted bandwidth downlink channel is less than the resolution of the measurement reports in the frequency and/or time domain for transmission resources comprising the restricted bandwidth downlink channel.

19. A method of operating a terminal device in a wireless telecommunications system in which downlink communications are made by a base station using a radio interface that spans a system frequency bandwidth and the terminal device is configured to receive at least some communications from the base station within a restricted subset of transmission resources selected from within the system frequency bandwidth and comprising a restricted bandwidth downlink channel having a channel bandwidth which is smaller than the system frequency bandwidth, the method comprising:
measuring channel conditions across the system frequency bandwidth; and
transmitting to the base station channel condition measurement reports for a plurality of frequencies across the system frequency bandwidth, wherein measurement reports for transmission resources not comprising the restricted bandwidth downlink channel are transmitted aperiodically and measurement reports for transmission resources comprising the restricted bandwidth downlink channel are transmitted periodically.

20. The method according to clause 19, wherein measurement reports for transmission resources comprising the restricted bandwidth downlink channel are transmitted periodically using transmission resources on a physical uplink shared channel of the wireless telecommunications system.

21. The method according to clause 20, wherein the radio interface has a radio frame structure comprising a plurality of radio subframes, and wherein the method further comprises receiving an allocation message from the base station which indicates resources on the physical uplink shared channel to be used for transmitting measurement reports for a plurality of subframes.

22. The method according to clause 20, wherein the radio interface has a radio frame structure comprising a plurality of radio subframes, and wherein the method comprises transmitting measurement reports for transmission resources comprising the restricted bandwidth downlink channel using resources on the physical uplink shared channel in a subframe without having received specific allocation signalling to specifically allocate resources in that specific subframe.

23. The method according to clauses 19 to 22, further comprising receiving configuration signalling from the base station which indicates at least one indication selected from the group comprising: an indication of a period for the periodic transmitting of measurement reports for transmission resources comprising the restricted bandwidth downlink channel; an indication of a resolution in the frequency domain for the measurement reports for transmission resources comprising the restricted bandwidth downlink channel; and timings for the measurement reports for transmission resources comprising the restricted bandwidth downlink channel.

24. The method according to clauses 19 to 23, wherein measurement reports for transmission resources not comprising the restricted bandwidth downlink channel are associated with a subset of the measurements of channel conditions made for transmission resources not comprising the restricted bandwidth downlink channel, wherein the subset is selected to comprise measurement reports for transmission resources associated with poor channel conditions.

25. A terminal device for use in a wireless telecommunications system in which downlink communications are made by a base station using a radio interface that spans a system frequency bandwidth and the terminal device is configured to receive at least some communications from the base station within a restricted subset of transmission resources selected from within the system frequency bandwidth and comprising a restricted bandwidth downlink channel having a channel bandwidth which is smaller than the system frequency bandwidth, wherein the terminal device is configured to:

measure channel conditions across the system frequency bandwidth; and transmit to the base station channel condition measurement reports for a plurality of frequencies across the system frequency bandwidth, wherein measurement reports for transmission resources not comprising the restricted bandwidth downlink channel are transmitted aperiodically and measurement reports for transmission resources comprising the restricted bandwidth downlink channel are transmitted periodically.

26. A wireless telecommunications system comprising the terminal device according to clause 25 and a base station.

27. A method of operating a base station in a wireless telecommunications system in which downlink communications are made by the base station using a radio interface that spans a system frequency bandwidth and the base station is configured to transmit at least some communications to a terminal device within a restricted subset of transmission resources selected from within the system frequency bandwidth and comprising a restricted bandwidth downlink channel having a channel bandwidth which is smaller than the system frequency bandwidth, the method comprising receiving from the terminal device channel condition measurement reports for a plurality of frequencies across the system frequency bandwidth, wherein measurement reports for transmission resources not comprising the restricted bandwidth downlink channel are received aperiodically and measurement reports for transmission resources comprising the restricted bandwidth downlink channel are received periodically.

28. A base station in a wireless telecommunications system in which downlink communications are made by the base station using a radio interface that spans a system frequency bandwidth and the base station is configured to transmit at least some communications to a terminal device within a restricted subset of transmission resources selected from within the system frequency bandwidth and comprising a restricted bandwidth downlink channel having a channel bandwidth which is smaller than the system frequency bandwidth, wherein the base station so configured to receive from the terminal device channel condition measurement reports for a plurality of frequencies across the system frequency bandwidth, wherein measurement reports for transmission resources not comprising the restricted bandwidth downlink channel are received aperiodically and measurement reports for transmission resources comprising the restricted bandwidth downlink channel are received periodically.

29. The method according to clause 28, further comprising the base station scheduling data transmissions for the terminal device on the transmission resources comprising the restricted bandwidth downlink channel in dependence on the measurement reports for the transmission resources comprising the restricted bandwidth downlink channel.

30. The method according to clause 28, further comprising the base station determining the transmission resources comprising the restricted bandwidth downlink channel for the terminal device should be changed based on the measurement reports.

31. A method of operating a terminal device in a wireless telecommunications system in which downlink communications are made by a base station using a radio interface that spans a system frequency bandwidth and the terminal device is configured to receive at least some communications from the base station within a restricted subset of transmission resources selected from within the system frequency bandwidth and comprising a restricted bandwidth downlink channel having a channel bandwidth which is smaller than the system frequency bandwidth, the method comprising:

measuring channel conditions across the system frequency bandwidth; and transmitting to the base station channel condition measurement reports for a plurality of frequencies across the system frequency bandwidth, wherein the measurement reports for transmission resources not comprising the restricted bandwidth downlink channel are associated with a selected subset of the measurements of channel conditions made for transmission resources not comprising the restricted bandwidth downlink channel, and wherein the subset is selected so the measurement reports are provided for the transmission resources associated with poor channel conditions.

32. The method according to clause 31, wherein the selected subset comprises a number of channel condition measurements for which the associated channel conditions are determined to be worse than the channel conditions associated with channel condition measurements which are not in the selected subset.

33. The method according to clause 31 or 32, wherein the selected subset comprises a predetermined number of channel condition measurements.

34. The method according to clauses 31, 32 or 33, further comprising switching between transmitting measurement reports associated with a selected subset of channel condition measurements associated with poor channel conditions and transmitting measurement reports associated with a selected subset of channel condition measurements associated with good channel conditions.

35. The method according to clause 34, wherein switching between transmitting measurement reports associated poor channel conditions and transmitting measurement reports associated with good channel conditions is made in response to signalling received from the base station.

36. A terminal device for use in a wireless telecommunications system in which downlink communications are made by a base station using a radio interface that spans a system frequency bandwidth and the terminal device is configured to receive at least some communications from the base station within a restricted subset of transmission resources selected from within the system frequency bandwidth and comprising a restricted bandwidth downlink channel having a channel bandwidth which is smaller than the system frequency bandwidth, the method comprising: wherein the terminal device is configured to:

measure channel conditions across the system frequency bandwidth; and transmit to the base station channel condition measurement reports for a plurality of frequencies across the system frequency bandwidth, wherein the measurement reports for transmission resources not comprising the restricted bandwidth downlink channel are associated with a selected subset of the measurements of channel conditions made for transmission resources not comprising the restricted bandwidth downlink channel, and wherein the subset is selected so the measurement reports are provided for the transmission resources associated with poor channel conditions.

37. A wireless telecommunications system comprising the terminal device according to clause 36 and a base station.

38. A method of operating a base station in a wireless telecommunications system in which downlink communications are made by the base station using a radio interface that spans a system frequency bandwidth and the base station is configured to transmit at least some communications to a terminal device within a restricted subset of transmission resources selected from within the system frequency bandwidth and comprising a restricted bandwidth downlink channel having a channel bandwidth which is smaller than the system frequency bandwidth, the method comprising: receiving from the terminal device channel condition measurement reports for a plurality of frequencies across the system frequency bandwidth, wherein the measurement reports for transmission resources not comprising the restricted bandwidth downlink channel are associated with a selected subset of the measurements of channel conditions made for transmission resources not comprising the restricted bandwidth downlink channel, wherein the subset is selected so the measurement reports are provided for the transmission resources associated with poor channel conditions.

39. The method according to clause 38, wherein the selected subset comprises a number of channel condition measurements for which the associated channel conditions are determined to be worse than the channel conditions associated with channel condition measurements which are not in the selected subset.

40. The method according to clause 38 or 39, wherein the selected subset comprises a predetermined number of channel condition measurements.

41. The method according to clause 38, 39 or 40, further comprising switching between receiving measurement reports associated with a selected subset of channel condition measurements associated with poor channel conditions and receiving measurement reports associated with a selected subset of channel condition measurements associated with good channel conditions.

42. The method according to clause 41, further comprising transmitting signalling to the terminal device to indicate the terminal device should switch between transmitting measurement reports associated with poor channel conditions and transmitting measurement reports associated with good channel conditions.

43. The method according to clause 42, wherein the signalling is transmitted to the terminal device in response to the base station determining there should be a change in the transmission resources comprising the restricted bandwidth downlink channel to indicate the terminal device should switch to transmitting measurement reports associated poor channel conditions.

44. The method according to clauses 38 to 43, further comprising the base station scheduling data transmissions for the terminal device on the transmission resources comprising the restricted bandwidth downlink channel in dependence on measurement reports for the transmission resources comprising the restricted bandwidth downlink channel.

45. The method according to clauses 38 to 44, further comprising the base station selecting new transmission resources for comprising the restricted bandwidth downlink channel for the terminal device based on the measurement reports.

46. A base station for use in a wireless telecommunications system in which downlink communications are made by the base station using a radio interface that spans a system frequency bandwidth and the base station is configured to transmit at least some communications to a terminal device within a restricted subset of transmission resources selected from within the system frequency bandwidth and comprising a restricted bandwidth downlink channel having a channel bandwidth which is smaller than the system frequency bandwidth, wherein the base station is configured to receive from the terminal device channel condition measurement reports for a plurality of frequencies across the system frequency bandwidth, wherein the measurement reports for transmission resources not comprising the restricted bandwidth downlink channel are associated with a selected subset of the measurements of channel conditions made for transmission resources not comprising the restricted bandwidth downlink channel, wherein the subset is selected so the measurement reports are provided for the transmission resources associated with poor channel conditions.

REFERENCES

[1] ETSI TS 122 368 V11.6.0 (2012-09)/3GPP TS 22.368 version 11.6.0 Release 11
[2] GB 2 487 906 (UK patent application GB 1101970.0)
[3] GB 2 487 908 (UK patent application GB 1101981.7)
[4] GB 2 487 780 (UK patent application GB 1101966.8)
[5] GB 2 488 513 (UK patent application GB 1101983.3)
[6] GB 2 487 757 (UK patent application GB 1101853.8)
[7] GB 2 487 909 (UK patent application GB 1101982.5)
[8] GB 2 487 907 (UK patent application GB 1101980.9)
[9] GB 2 487 782 (UK patent application GB 1101972.6)
[10] GB 2 497 743 (UK patent application GB 1121767.6)
[11] GB 2 497 742 (UK patent application GB 1121766.8)
[12] Holma H. and Toskala A, "*LTE for UMTS OFDMA and SC-FDMA based radio access*", John Wiley and Sons, 2009
[13] ETSI TS 136 213 V11.4.0 (2013-10)/3GPP TS 36.213 version 11.4.0 Release 11

What is claimed is:

1. A method of operating a terminal device in a wireless telecommunications system in which downlink communications are made by a base station using a radio interface that spans a system frequency bandwidth and the terminal device is configured to receive at least some communications from the base station within a restricted subset of transmission resources selected from within the system frequency bandwidth, the restricted subset of transmission resources comprising a restricted bandwidth downlink channel having a channel bandwidth which is smaller than the system frequency bandwidth, the method comprising:
- measuring channel conditions across the system frequency bandwidth;
- determining, based on the measured channel conditions across the system frequency bandwidth, a subset of frequency bands having channel conditions below a predetermined quality threshold;
- aperiodically transmitting, to the base station, first channel condition measurement reports for a plurality of frequencies across the system frequency bandwidth not comprising the restricted subset of transmission resources and not comprising frequencies in the subset of frequency bands;
- periodically transmitting, to the base station, second channel condition measurement reports for transmission resources comprising only the restricted bandwidth downlink channel and not comprising frequencies in the subset of frequency bands; and
- periodically transmitting, to the base station, third channel condition measurement reports for transmission resources that are within both the restricted bandwidth downlink channel and the subset of frequency bands.

2. The method of claim 1, wherein the second channel condition measurement reports are transmitted periodically using transmission resources on a physical uplink shared channel (PUSCH) of the wireless telecommunications system.

3. The method of claim 2, wherein
the radio interface has a radio frame structure comprising a plurality of radio subframes, and
the method further comprises receiving an allocation message, from the base station, which indicates resources on the PUSCH to be used for transmitting channel condition measurement reports for a plurality of subframes.

4. The method of claim 2, wherein
the radio interface has a radio frame structure comprising a plurality of radio subframes, and
the periodically transmitting the second channel condition measurement reports is performed on the PUSCH in a subframe without having received specific allocation signalling to specifically allocate resources in that specific subframe.

5. The method of claim 1, further comprising receiving configuration signalling, from the base station, which indicates at least one indication selected from a group comprising:
- an indication of a period for the periodic transmitting the second channel condition measurement reports;
- an indication of a resolution in the frequency domain for the second channel condition measurement reports; and
- timings for the second channel condition measurement reports.

6. Terminal device for use in a wireless telecommunications system in which downlink communications are made by a base station using a radio interface that spans a system frequency bandwidth and the terminal device is configured to receive at least some communications from the base station within a restricted subset of transmission resources selected from within the system frequency bandwidth, the restricted subset of transmission resources comprising a restricted bandwidth downlink channel having a channel bandwidth which is smaller than the system frequency bandwidth, the terminal device comprising:
processing circuitry is configured to:
- measure channel conditions across the system frequency bandwidth;
- determine, based on the measured channel conditions across the system frequency bandwidth, a subset of frequency bands having channel conditions below a predetermined quality threshold;
- aperiodically transmit, to the base station, first channel condition measurement reports for a plurality of frequencies across the system frequency bandwidth not comprising the restricted subset of transmission resources;
- periodically transmit, to the base station, the second channel condition measurement reports for transmission resources comprising only the restricted bandwidth downlink channel and not comprising frequencies in the subset of frequency bands; and
- periodically transmit, to the base station, third channel condition measurement reports for transmission resources that are within both the restricted bandwidth downlink channel and the subset of frequency bands.

7. The terminal device of claim 6, wherein the processing circuitry periodically transmits the second channel condition measurement reports using transmission resources on a physical uplink shared channel (PUSCH) of the wireless telecommunications system.

8. The terminal device of claim 7, wherein
the radio interface has a radio frame structure comprising a plurality of radio subframes, and
the processing circuitry is further configured to receive an allocation message, from the base station, which indicates resources on the PUSCH to be used for transmitting channel condition measurement reports for a plurality of subframes.

9. The terminal device of claim 7, wherein
the radio interface has a radio frame structure comprising a plurality of radio subframes, and
the processing circuitry periodically transmits the second channel condition measurement reports on the PUSCH in a subframe without having received specific allocation signalling to specifically allocate resources in that specific subframe.

10. The terminal device of claim 6, wherein the processing circuitry is further configured to receive configuration signalling, from the base station, which indicates at least one indication selected from a group comprising:
- an indication of a period for the periodic transmitting the second channel condition measurement reports;
- an indication of a resolution in the frequency domain for the second channel condition measurement reports; and
- timings for the second channel condition measurement reports.

11. A method of operating a base station in a wireless telecommunications system in which downlink communications are made by the base station using a radio interface that spans a system frequency bandwidth, the method comprising:
- transmitting, to a terminal device, communications within a restricted subset of transmission resources selected from within the system frequency bandwidth, the restricted subset of transmission resources comprising a restricted bandwidth downlink channel having a channel bandwidth which is smaller than the system frequency bandwidth;

aperiodically receiving, from the terminal device, first channel condition measurement reports for transmission resources not comprising the restricted subset of transmission resources and not comprising frequencies in a subset of frequency bands having channel conditions below a predetermined threshold, the terminal device having determined the subset of frequency bands based on measured channel conditions across the system frequency bandwidth;

periodically receiving, from the terminal device, second channel condition measurement reports for transmission resources comprising only the restricted bandwidth downlink channel and not comprising frequencies in the subset of frequency bands; and periodically receiving, from the terminal device, third channel condition measurement reports for transmission resources that are within both the restricted bandwidth downlink channel and the subset of frequency bands.

12. The method of claim 11, wherein the second channel condition measurement reports are received periodically using transmission resources on a physical uplink shared channel (PUSCH) of the wireless telecommunications system.

13. The method of claim 12, wherein
the radio interface has a radio frame structure comprising a plurality of radio subframes, and
the method further comprises transmitting an allocation message, to the terminal device, which indicates resources on the PUSCH to be used for receiving channel condition measurement reports for a plurality of subframes.

14. The method of claim 12, wherein
the radio interface has a radio frame structure comprising a plurality of radio subframes, and
the periodic receiving the second channel condition measurement reports is performed on the PUSCH in a subframe without having received specific allocation signalling to specifically allocate resources in that specific subframe.

15. The method of claim 11, further comprising transmitting configuration signalling, to the terminal device, which indicates at least one indication selected from a group comprising:
an indication of a period for the periodic transmission the second channel condition measurement reports;
an indication of a resolution in the frequency domain for the second channel condition measurement reports; and
timings for the second channel condition measurement reports.

* * * * *